(12) United States Patent
Zhang et al.

(10) Patent No.: US 12,719,594 B2
(45) Date of Patent: Aug. 25, 2026

(54) CROSS LINK INTERFERENCE RESOURCE REPORTING

(71) Applicant: QUALCOMM Incorporated, San Diego, CA (US)

(72) Inventors: Qian Zhang, Basking Ridge, NJ (US); Yan Zhou, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 413 days.

(21) Appl. No.: 18/336,780

(22) Filed: Jun. 16, 2023

(65) Prior Publication Data

US 2024/0421921 A1 Dec. 19, 2024

(51) Int. Cl.
*H04B 17/336* (2015.01)
*H04L 5/00* (2006.01)

(52) U.S. Cl.
CPC ......... *H04B 17/336* (2015.01); *H04L 5/0051* (2013.01)

(58) Field of Classification Search
CPC ............................ H04B 17/336; H04L 5/0051
See application file for complete search history.

(56) References Cited

U.S. PATENT DOCUMENTS

| | | | | |
|---|---|---|---|---|
| 2022/0095144 | A1* | 3/2022 | Ren | H04W 24/02 |
| 2022/0104057 | A1* | 3/2022 | Abedini | H04W 28/16 |
| 2022/0272680 | A1* | 8/2022 | Landis | H04W 72/02 |
| 2022/0295305 | A1* | 9/2022 | Hwang | H04W 16/28 |
| 2023/0146833 | A1* | 5/2023 | Ibrahim | H04L 5/001 370/252 |
| 2023/0164606 | A1* | 5/2023 | Zhou | H04L 5/0073 370/329 |
| 2023/0188229 | A1* | 6/2023 | Xu | H04B 7/088 370/329 |
| 2025/0226899 | A1* | 7/2025 | Xiong | H04L 5/0073 |
| 2025/0344086 | A1* | 11/2025 | Shim | H04J 11/0026 |

* cited by examiner

*Primary Examiner* — Zhiren Qin
(74) *Attorney, Agent, or Firm* — Patterson & Sheridan, L.L.P.

(57) ABSTRACT

Certain aspects of the present disclosure provide techniques for cross link interference (CLI) resource reporting. An example method, performed at a first network entity, includes receiving a report, from a first user equipment (UE), indicating information regarding one or more first cross-link interference (CLI) resources, wherein the one or more first CLI resources correspond to one or more transmission beams associated with at least one second UE and are associated with lower levels of measured CLI than one or more second CLI resources, and performing one or more actions, based on the information.

23 Claims, 20 Drawing Sheets

Use case 1

Use case 3

800

| gNB | UE | Comments |
| --- | --- | --- |
| FD Disabled | FD Disabled | Baseline Operation |
| FD Disabled | FD Enabled | Use Case 1 for mTRP |
| FD Enabled | FD Disabled | Use Case 2 and IAB |
| FD Enabled | FD Enabled | Use Case 3 |

FIG. 8

1010
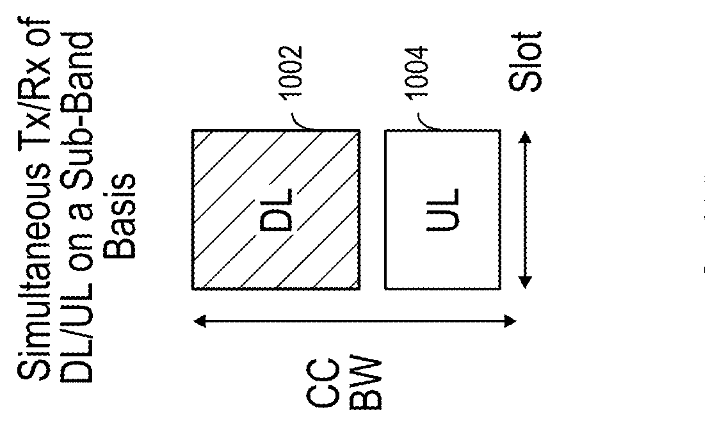
FIG. 10B
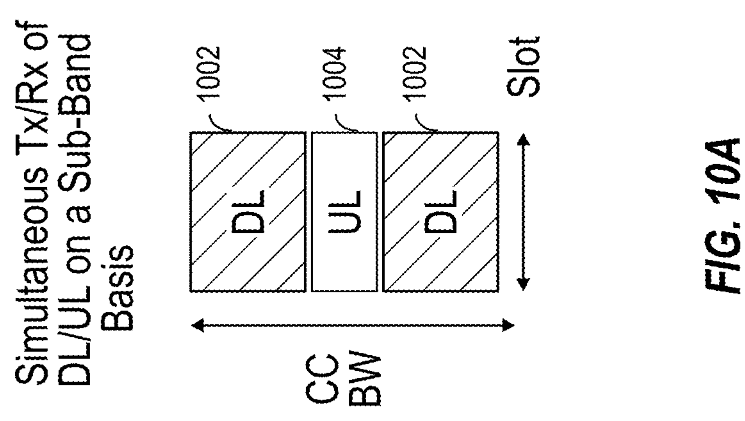
FIG. 10A
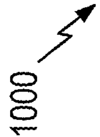

CROSS LINK INTERFERENCE RESOURCE REPORTING

BACKGROUND

Field of the Disclosure

Aspects of the present disclosure relate to wireless communications, and more particularly, to techniques for cross link interference (CLI) resource reporting.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications at a first network entity. The method includes receiving a report, from a first user equipment (UE), indicating information regarding one or more first cross-link interference (CLI) resources, wherein the one or more first CLI resources correspond to one or more transmission beams associated with at least one second UE and are associated with lower levels of measured CLI than one or more second CLI resources; and performing one or more actions, based on the information.

Another aspect provides a method for wireless communications at a first user equipment (UE). The method includes measuring reference signals (RS) on cross-link interference (CLI) resources that correspond to transmission beams associated with at least one second UE; and transmitting a report, based on the measuring, indicating information regarding one or more first CLI resources associated with lower levels of measured CLI than one or more second CLI resources.

Another aspect provides a method for wireless communications at a first network entity. The method includes receiving a report, from a first user equipment (UE) via at least one of physical layer or medium access control (MAC) layer signaling, indicating information regarding at least one of: one or more first cross-link interference (CLI) resources or one or more second CLI resources, wherein the one or more first CLI resources are associated with lower levels of measured CLI than one or more second CLI resources and the one or more first CLI resources, and the one or more second CLI resources correspond to one or more transmission beams associated with at least one second UE; and performing one or more actions, based on the information.

Another aspect provides a method for wireless communications at a first user equipment (UE). The method includes measuring reference signals (RS) on cross-link interference (CLI) resources that correspond to transmission beams associated with at least one second UE; and transmitting a report, via at least one of physical layer or medium access control (MAC) layer signaling, indicating information regarding at least one of: one or more first cross-link interference (CLI) resources or one or more second CLI resources, wherein the one or more first CLI resources are associated with lower levels of measured CLI than one or more second CLI resources and the one or more first CLI resources, and the one or more second CLI resources correspond to one or more transmission beams associated with at least one second UE.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 5-8 depict different use cases for full-duplex (FD) communications.

FIGS. 10A and 10B depict example sub-band full duplex (SBFD) slot configuration.

DETAILED DESCRIPTION

Aspects of the present disclosure provide apparatuses, methods, processing systems, and computer-readable mediums for cross link interference (CLI) resource reporting.

Full duplex (FD) communication generally refers to a mode of communication where signals can be transmitted and received simultaneously over a single communication channel. In an FD mode, simultaneous transmission between wireless nodes, such as a user equipment (UE) and a base station (BS), may occur. Sub-band full duplex (SBFD) generally refers to a mode where a time division duplex (TDD) carrier is split into uplink and downlink sub-bands to enable simultaneous transmission and reception (on different subbands) in a same slot that consists of multiple symbols.

Cross-link interference (CLI) refers to a phenomenon that occurs in wireless communication systems, particularly in cellular networks, where interference is caused between UEs in a same cell (e.g., intra-cell CLI) or different cells (e.g., inter-cell CLI). CLI typically arises when the transmission signals from one UE interfere with the reception signals of another neighboring UE. In other words, when UEs that neighbor each other communicate, CLI may be caused by the neighboring UEs (and/or network entities cells that serve the neighboring UEs) performing/scheduling uplink and downlink communications on the same frequency resources at the same time.

To manage CLI, some systems configure certain resources (CLI resources) for one UE (referred to as an aggressor UE) to transmit reference signals (RSs) while another UE (referred to as a victim UE) measures. The aggressor UE may transmit (RS on) different CLI resources using different transmit beams.

Aspects of the present disclosure provide flexibility in CLI measurement and reporting. According to certain aspects, a UE may report preferred and/or non-preferred CLI resources corresponding to transmission beams associated with neighboring UEs. For example, a UE may report the top X least interfering CLI resources (e.g., preferred CLI resources) and/or the top X most interfering CLI resources (e.g., non-preferred CLI resources). Based on the reporting, network entities (e.g., cells serving the neighboring UEs) may perform one or more actions in order to mitigate CLI between the neighboring UEs. Utilization of the techniques disclosed herein may provide significant advantages for CLI mitigation, reducing CLI and improving throughput and reliability of communications in wireless networks.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
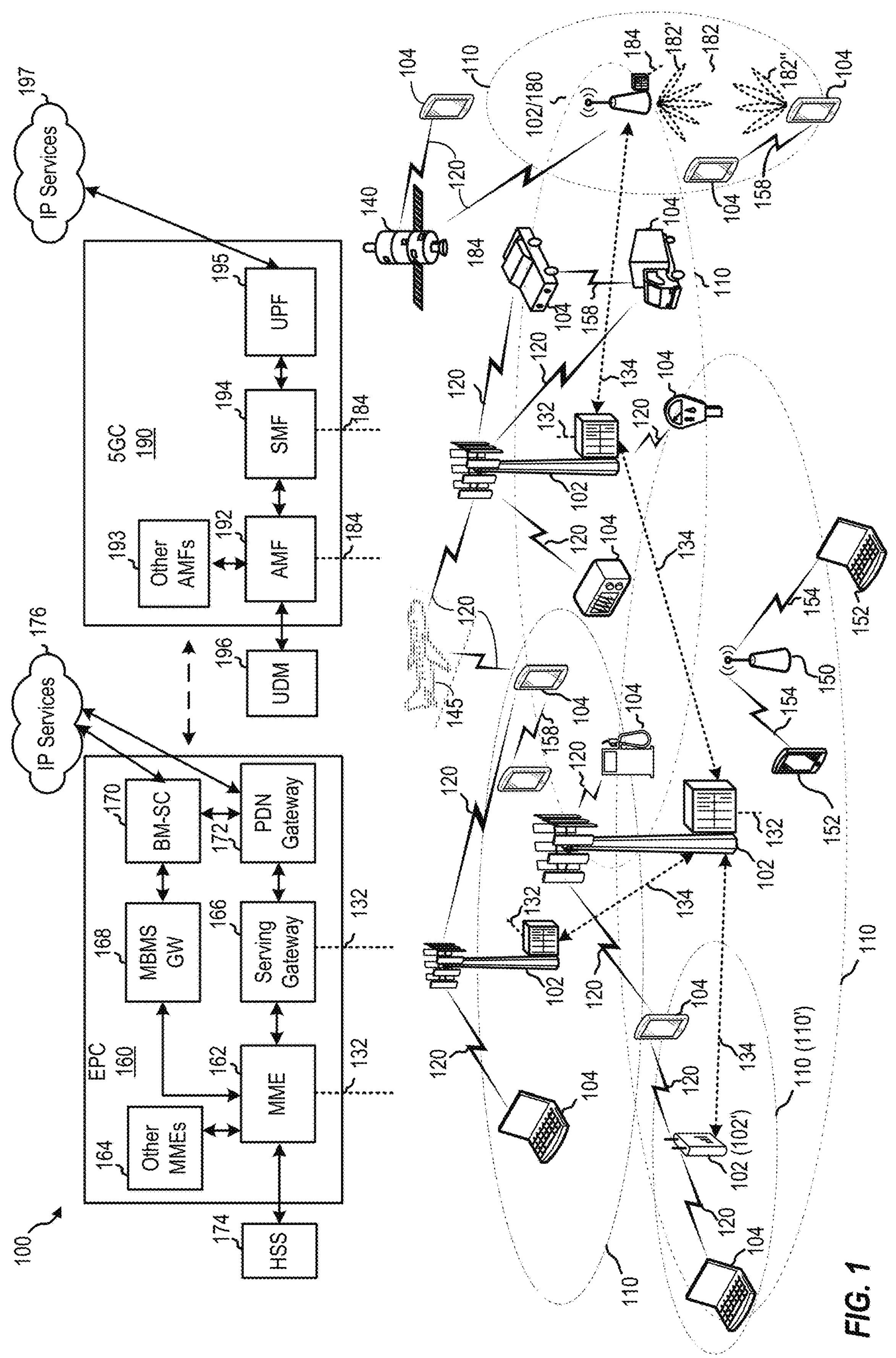
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
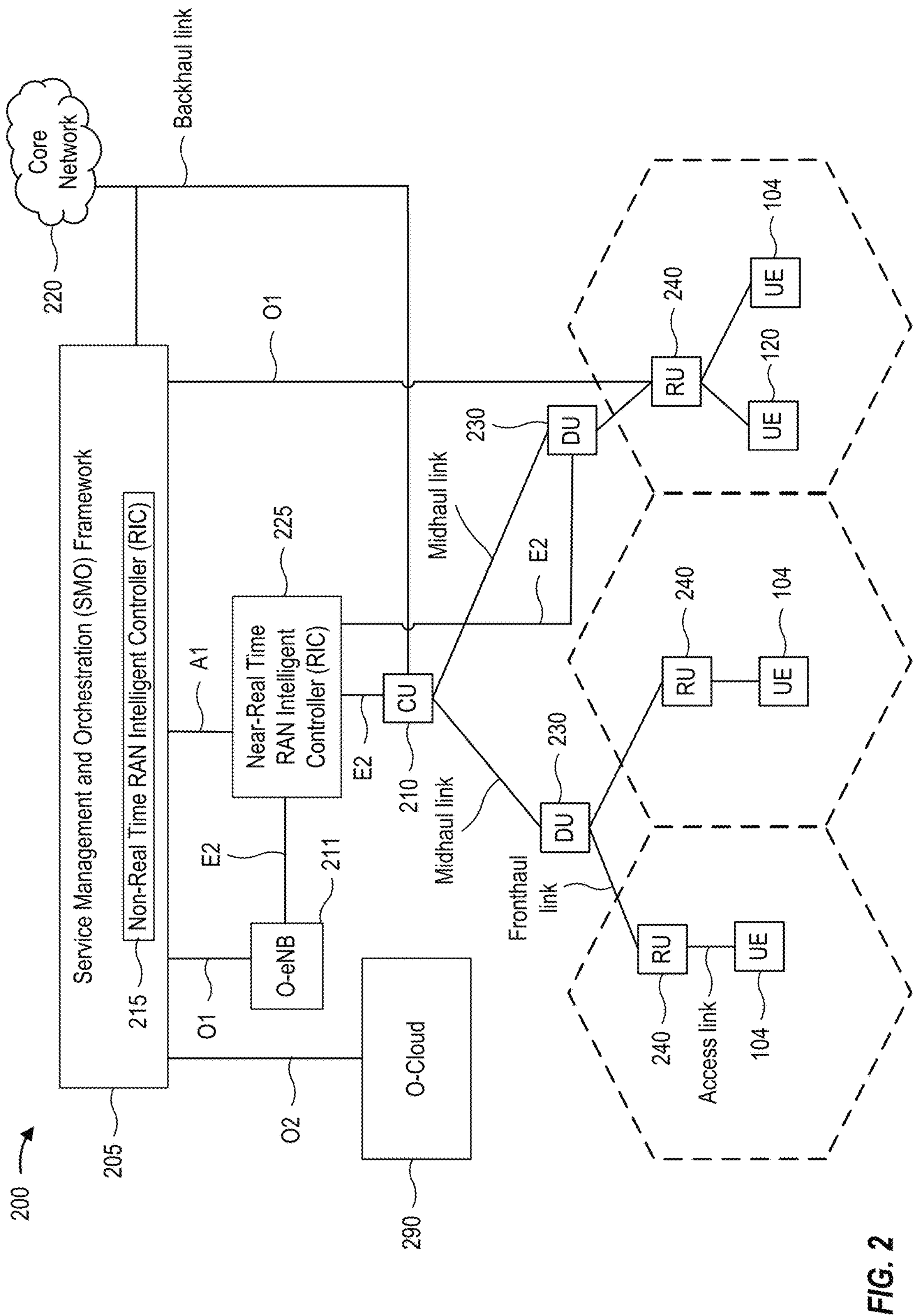
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHZ-7125 MHz, which is often referred to (interchangeably) as "Sub-6 GHz". Similarly, 3GPP currently defines Frequency Range 2 (FR2) as including 24,250 MHZ-52,600 MHZ, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-NB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
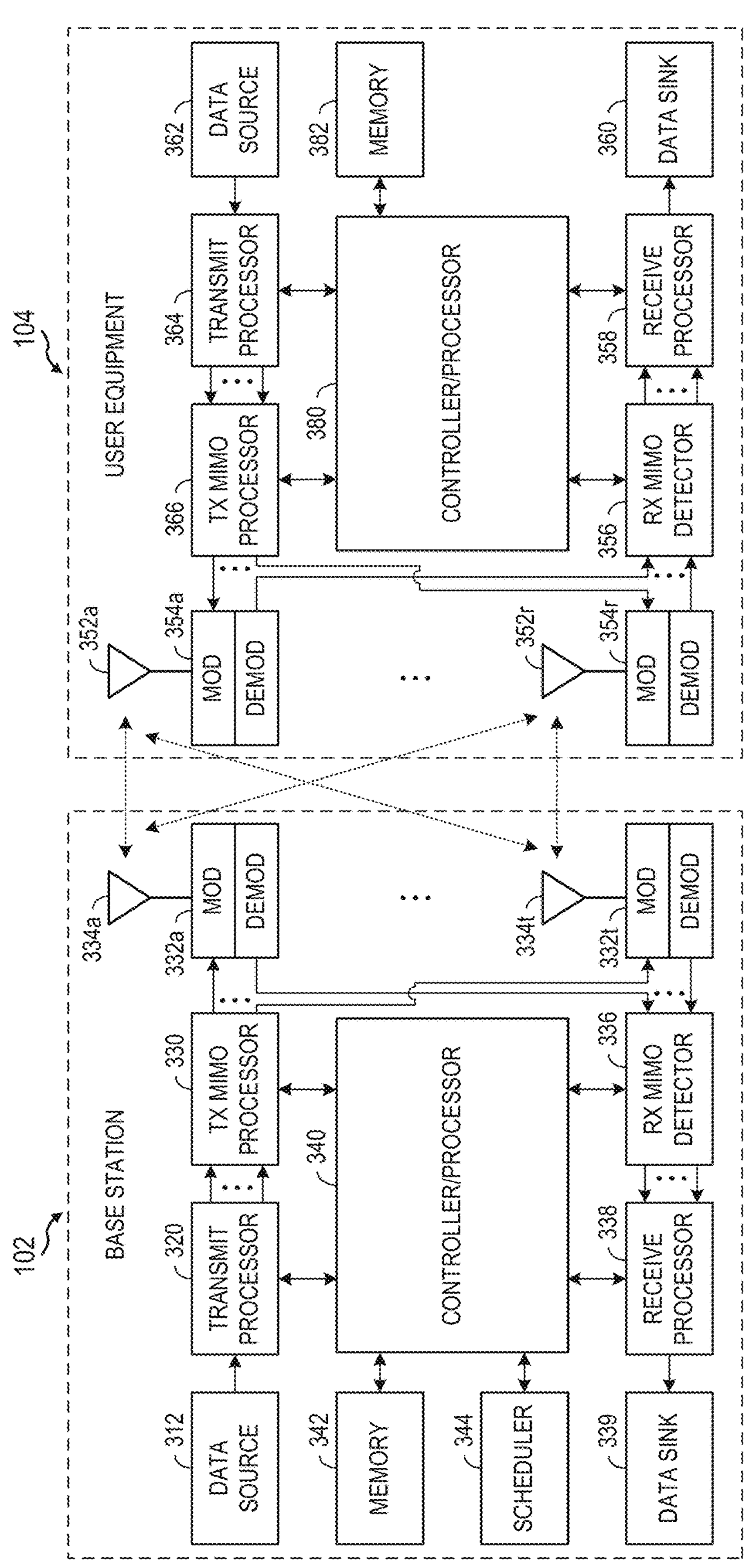
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving"

may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
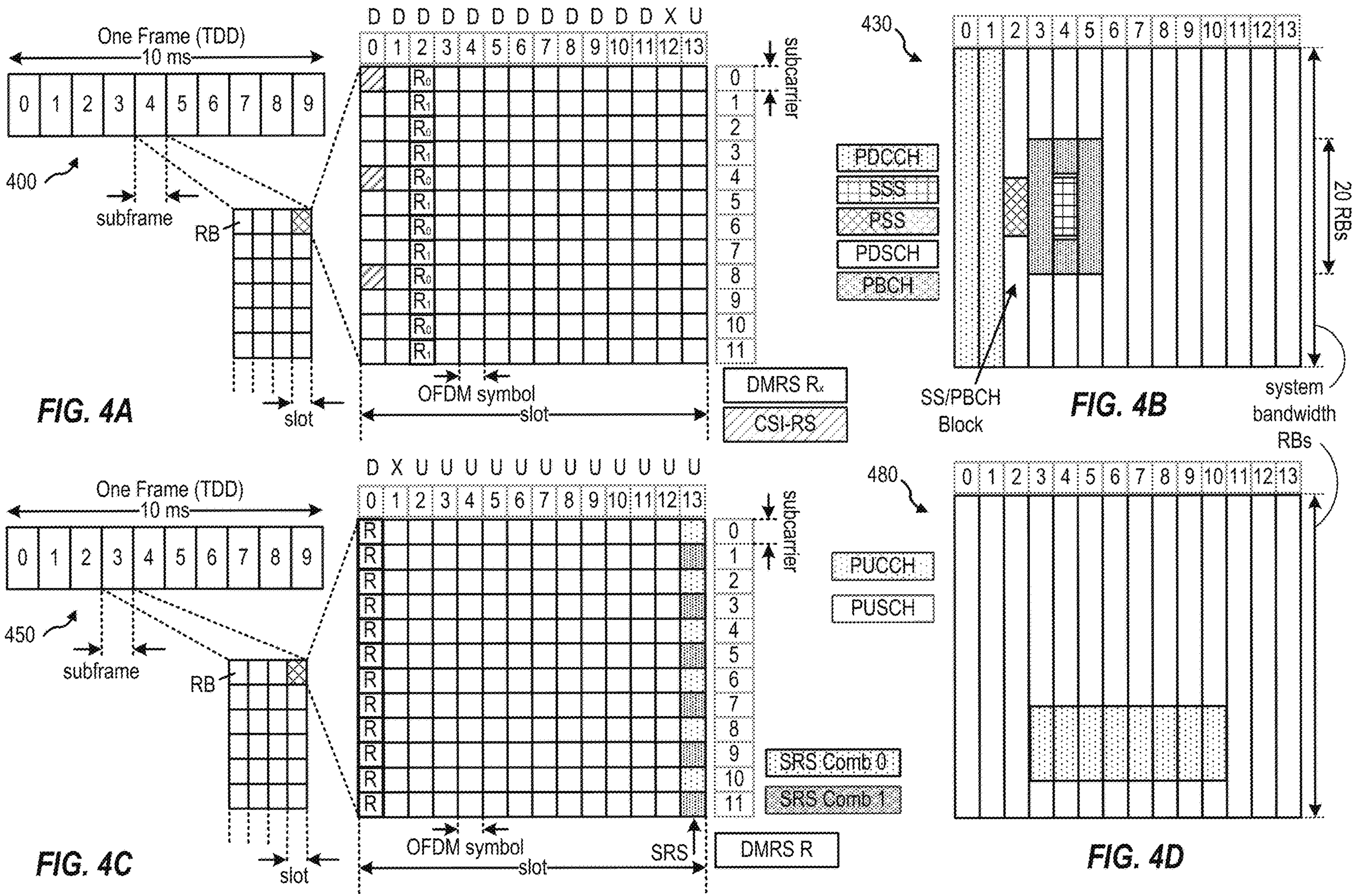
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where Dis DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^{\mu}\times15$ kHz, where u is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of Full-Duplex (FD) Systems

Full-duplex (FD) allows for simultaneous transmission between nodes (e.g., a user equipment (UE) and a base station (BS)). In a half-duplex (HD) system, communication flows in one direction at a time.

There are various motivations for utilizing FD communications, for example, for simultaneous uplink (UL)/downlink (DL) transmissions in Frequency Range 2 (FR2). In some cases, FD capability may enable flexible time division duplexing (TDD) capability, and may be present at either a base station (BS) or a UE or both. For example, at the UE, UL transmissions may be sent from one antenna panel (e.g., of multiple antenna panels) and DL receptions may be performed at another antenna panel. In another example, at a gNodeB (gNB), the UL transmissions may be from one panel and the DL receptions may be performed at another panel.

The FD capability may be conditional on a beam separation (e.g., self-interference between DL and UL, clutter echo, etc.). The FD capability may mean that the UE or the gNB is able to use frequency division multiplexing (FDM) or spatial division multiplexing (SDM) on slots conventionally reserved for UL only or DL only slots (or flexible slots that may be dynamically indicated as either UL or DL).

The potential benefits of the FD communications include latency reduction (e.g., it may be possible to receive DL signals in what would be considered UL only slots, which can enable latency savings), coverage enhancement, spectrum efficiency enhancements (per cell and/or per UE), and/or overall more efficient resource utilization.

Figure 5:
Figure 5:
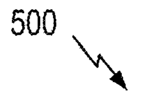
Figure 5:
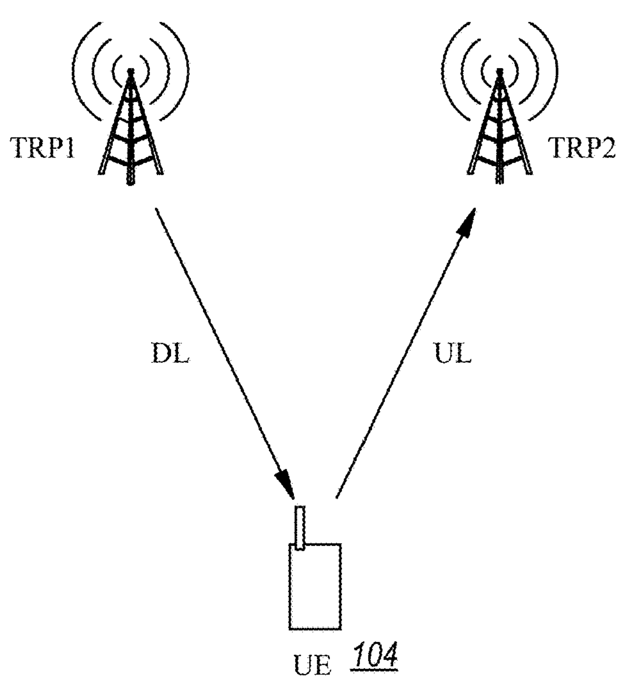
Figure 6:
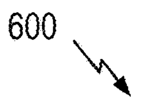
Figure 6:
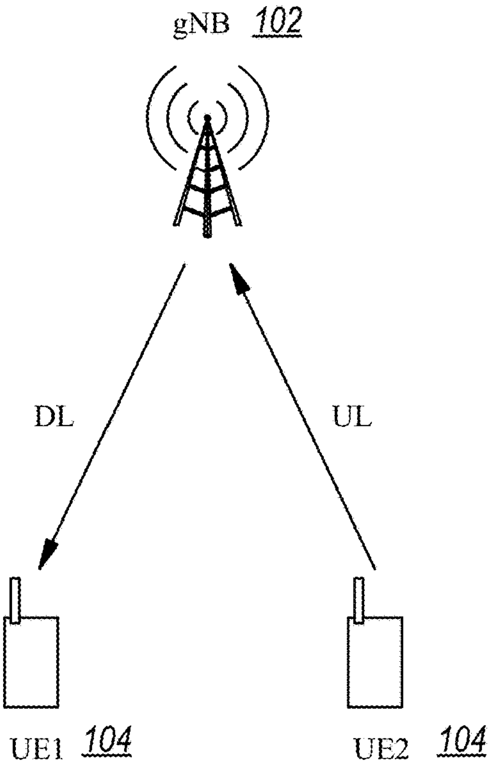
Figure 7:
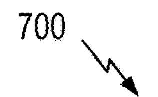
Figure 7:
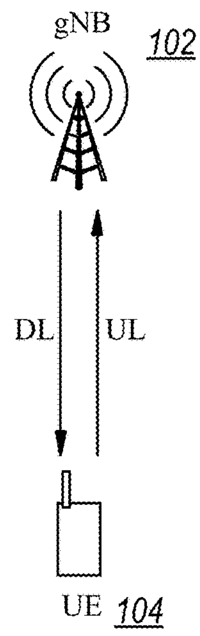

FIGS. 5-7 illustrate example use cases for FD communications. FIG. 8 summarizes certain possible features of these use cases.

Diagram 500 of FIG. 5 illustrates a first use case (e.g., Use Case 1) for FD communications. As illustrated, one UE 104 simultaneously communicates with a first transmitter receiver point (TRP 1) on DL, while transmitting to a second TRP on UL. For this use case, FD is disabled at a gNB (i.e., TRP 1, TRP 2) and enabled at the UE.

Diagram 600 of FIG. 6 illustrates a second use case (e.g., Use Case 2) for FD communications. As illustrated, one gNB 102 simultaneously communicates with a first UE (UE 1) on DL, while communicating with a second UE (UE 2) on UL. For this use case, FD is enabled at the gNB and disabled at the UEs. Use cases with the FD enabled at the gNB and disabled at the UEs may be suitable for integrated access and backhaul (IAB) applications as well (e.g., as illustrated in a table 800 of FIG. 8).

Diagram 700 of FIG. 7 illustrates a third use case (e.g., Use Case 3) for FD communications. As illustrated, a UE 104 simultaneously communicates with a gNB 102, transmitting on UL while receiving on DL. For this use case, FD is enabled at both the gNB and the UE.

Overview of Sub-Band Full Duplex (SBFD)

As compared to older communication standards, spectrum options for 5G new radio (NR) are considerably expanded. For example, a frequency range 2 (FR2) band extends from approximately 24 GHz to 60 GHz. Since the wavelength decreases as the frequency increases, the FR2 band is denoted as a millimeter wave band due to its relatively-small wavelengths. In light of this relatively short wavelength, the transmitted radio frequency (RF) signals in the FR2 band behave somewhat like visible light. Thus, just like light, millimeter-wave signals are readily shadowed by buildings and other obstacles. In addition, the received power per unit area of antenna element goes down as the frequency goes up. For example, a patch antenna element is typically a fraction of the operating wavelength (e.g., one-half of the wavelength) in width and length. As the wavelength goes down (and thus the size of the antenna element decreases), it may thus be seen that the signal energy received at the corresponding antenna element decreases. Millimeter-wave cellular networks will generally require a relatively-large number of base stations (BSs) due to the issues of shadowing and decreased received signal strength. A cellular provider must typically rent the real estate for the BSs such that widespread coverage for a millimeter-wave cellular network may become very costly.

As compared to the challenges of FR2, the electromagnetic properties of radio wave propagation in the sub-6 GHz bands are more accommodating. For example, the 5G NR frequency range 1 (FR1) band extends from approximately 0.4 GHz to 7 GHZ. At these lower frequencies, the transmitted RF signals tend to refract around obstacles such as buildings so that the issues of shadowing are reduced. In addition, the larger size for each antenna element means that a FR1 antenna element intercepts more signal energy as compared to an FR2 antenna element. Thus, just as was established for older networks, a 5G NR cellular network operating in the FR1 band will not require an inordinate amount of BSs. Given the favorable properties of the lower frequency bands, the sub-6 GHZ bands are often denoted as "beachfront" bands due to their desirability.

One issue with operation in the sub-6 GHz bands is that there is only so much bandwidth available. For this reason, Federal Communications Commission regulates the airwaves and conducts auctions for the limited bandwidth in the FR1 band. Given this limited bandwidth, it is challenging for a cellular provider to enable the high data rates that would be more readily achieved in the FR2 band. To meet these challenges, a "sub-band full duplex" (SBFD) network architecture is implemented, which is quite advantageous as it offers users the high data rates that would otherwise require usage of the FR2 band. The SBFD network architecture described herein provides the high data rates in the FR1 band, and thus lowers costs due to the smaller number of BSs per given area of coverage that may be achieved in the FR1 band as compared to the FR2 band.

Typically, each one millisecond (ms) subframe may consist of one or multiple adjacent slots. For example, one subframe includes four slots. In a four-slot structure, first two slots may be downlink (DL) slots whereas a final one of the fours slots is an uplink (UL) slot. The third slot is a special slot in which some symbols may be used for UL transmissions and others for DL transmissions. The resulting UL and DL traffic is thus time division duplexed (TDD) as arranged by the dedicated slots and as arranged by the symbol assignment in the special slot. Since the UL has only a single dedicated slot, UL communication may suffer from excessive latency since a user equipment (UE) is restricted to transmitting in the single dedicated UL slot and in the resource allocations within the special slot. Since there is only one dedicated UL slot in the repeating four-slot structure, the resulting latency can be problematic particularly for low-latency applications such as vehicle-to-vehicle communication. In addition, the energy for the UL communication is limited by its single dedicated slot.

To reduce uplink latency and increase the energy for the UL transmissions, SBFD mode may be implemented. The SBFD mode is a duplex mode with a TDD carrier split into sub-bands to enable simultaneous transmission and reception in same slots. For example, in the SBFD mode, some slots are modified as SBFD slots to support frequency duplexing for simultaneous UL and DL transmissions. Some slots may remain as legacy TDD slots where one slot is still dedicated to DL and another slot dedicated to UL. In one example four-slot structure, in the SBFD mode, the second and third slots may be SBFD slots modified to support frequency duplexing for simultaneous UL and DL transmissions. The first slot and the fourth slot may remain as legacy TDD slots such that the first slot is still dedicated to DL and the fourth slot dedicated to UL. In other examples, any slot may be used in the SBFD mode.

In the sub-6 GHz spectrum, the relatively-limited separation between antennas on a device will lead to substantial self-interference should the device engage in a simultaneous UL and DL transmission. In some cases, the frequency duplexing in the SBFD slots may be practiced by a BS transceiver.

Figures 9A, 9B, 9C:
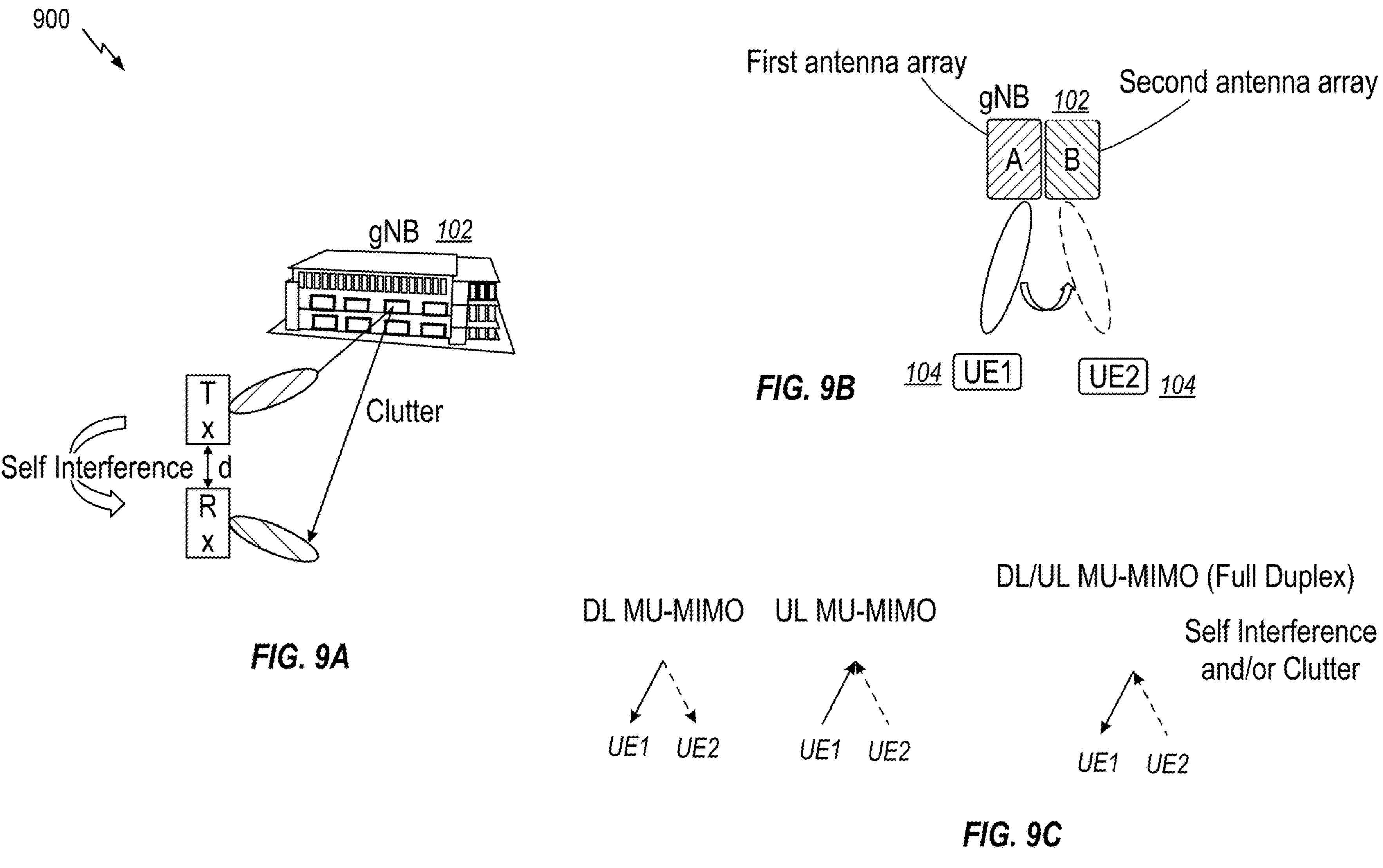
FIGS. 9A, 9B, and 9C depict examples of FD operation at a gNodeB (gNB).

For example, diagram 900 of FIG. 9A depicts full-duplex (FD) operation at a gNodeB (gNB) 102. An antenna system for the gNB is subdivided into a first antenna array that is separated from a second antenna array by an insulating distance such as, for example, 10 to 30 cm. As illustrated in FIG. 9B, during the SBFD operation, one of the antenna arrays transmits (e.g., to a first UE (UE1)) while the other antenna array is receiving (e.g., from a second UE (UE2)). As illustrated in FIG. 9C, CLI may occur in DL MU-MIMO, where a DL transmission from UE1 potentially interferes with reception by UE2, as well as UL MU-MIMO, where an UL transmission from UE1 potentially interferes with an UL transmission from UE2. In a FD scenario, in addition to CLI, UEs may be subject to self-interference and/or clutter.

The self-interference problem is partially addressed by a physical separation between the antenna arrays of the gNB. To provide additional isolation, a conducting shield between the antenna arrays of the gNB may also be implemented. It will be appreciated, however, that frequency duplexing may also be practiced by the device (or more generally, a UE) should the device practice sufficient self-interference cancellation. In other cases, however, the UE may be limited to half-duplex (HD) transmission such that the UE's antenna array is entirely dedicated to just transmitting or to just receiving in respective slots.

Example SBFD slots are depicted in FIG. 10A and FIG. 10B. For example, FIG. 10A depicts SBFD slot 1000 and FIG. 10B depicts SBFD slot 1010. Note that neither the UL nor the DL in the SBFD slots 1000, 1010 may occupy an entire frequency resource range (e.g., a frequency band) for these SBFD slots.

As depicted in FIG. 10A, the UL occupies a central sub-band in the frequency band for the SBFD slot 1000. The DL occupies a lower sub-band that ranges from a lower frequency for the frequency band up to a lowest frequency for the UL central sub-band. In some cases, the sub-bands may be separated by a guard band. The DL also occupies an upper sub-band in the frequency band and extends from a greatest frequency for the UL central sub-band to a greatest frequency for the frequency band. In one example, the UL central sub-band may be symmetric about a center frequency for the SBFD slot 1000. In such example, the bandwidth for the DL lower sub-band and the DL upper sub-band would be equal. However, in other examples, the DL lower sub-band bandwidth may be different from the bandwidth for the DL upper sub-band. In some examples, the DL upper and lower sub-bands may each have the bandwidth that may vary as 10 MHZ, 20 MHZ, 30 MHz or 40 MHz depending upon a DL data rate.

The use of the SBFD slot is advantageous with regard to minimizing or reducing UE-to-UE interference and transmit-to-receive self-interference at a BS. In some cases, the use of the SBFD slot may also enhance system capacity, improve resource utilization and spectrum efficiency (e.g., by enabling flexible and dynamic UL/DL resource adaption according to UL/DL traffic in a robust manner).

Figure 11:
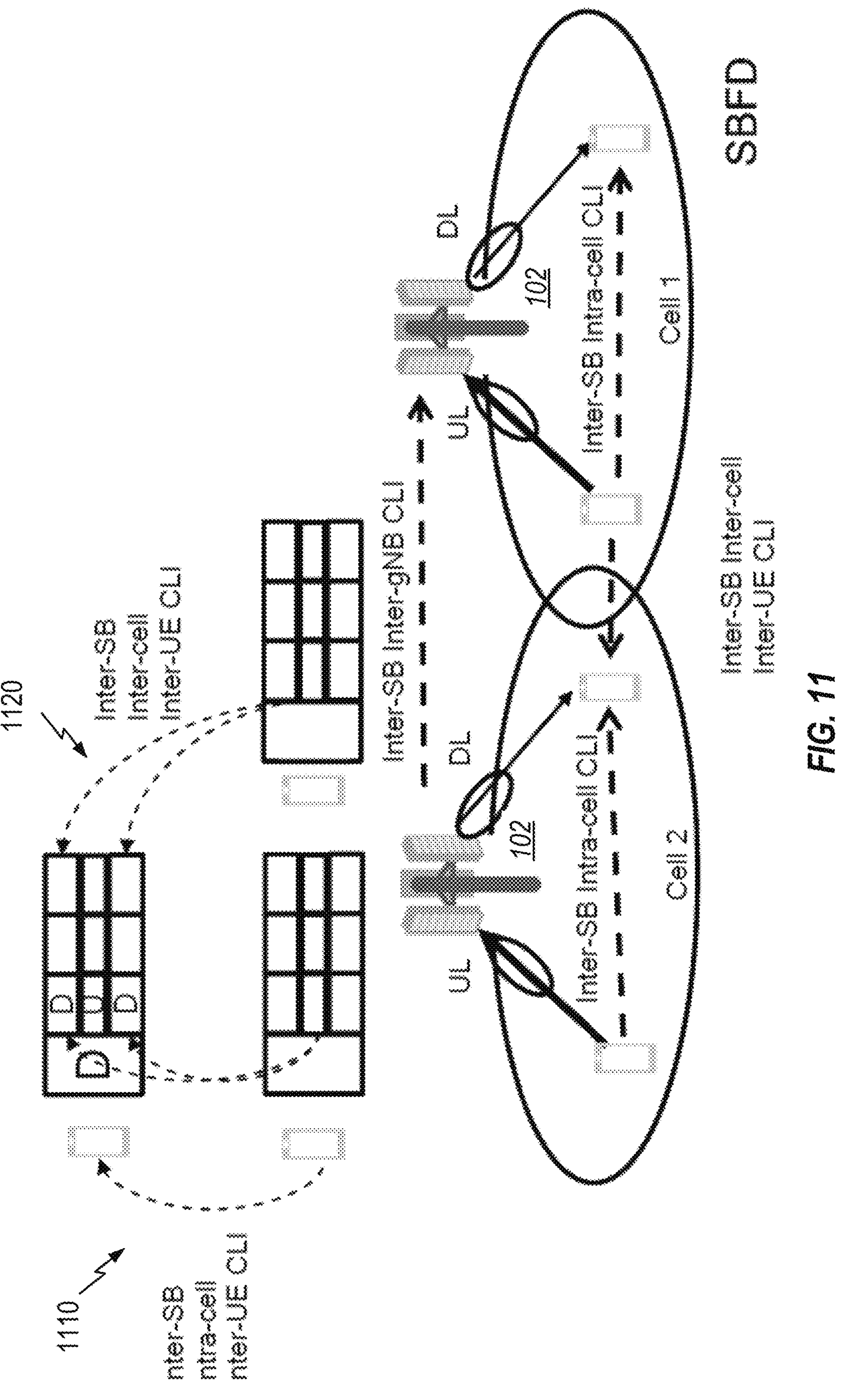
FIG. 11 and FIG. 12 depict examples of cross link interference (CLI).
Figure 12:
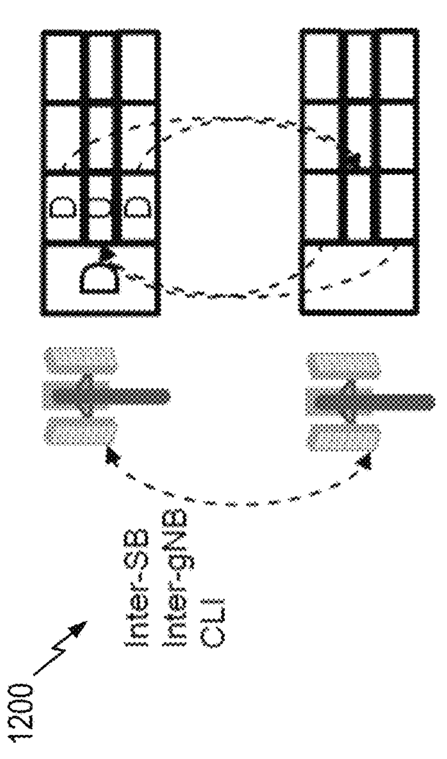
Figure 12:
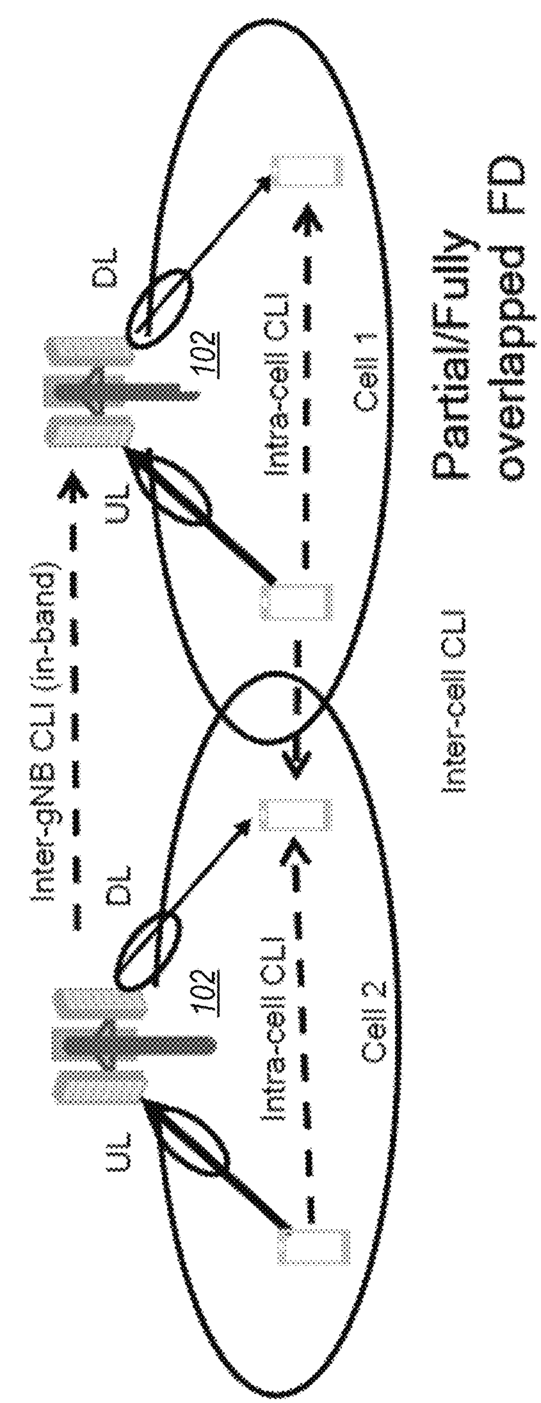

FIGS. 11 and 12 depict examples of intra-cell and inter-cell CLI in adjacent cells (Cell 1 and Cell 2) operating with SBFD. The example assumes that a slot may be configured with both uplink (U) and downlink (D) subbands. As illustrated at 1110, this may result in (inter-SB and) intra-cell CLI in Cell 2 when a first UE transmits on the UL subband while another UE is receiving on a DL subband. Further, as illustrated at 1120, UL transmissions from a UE in Cell 1 may result in (inter-SB and) inter-cell CLI. Still further, as illustrated at 1200 of FIG. 12, inter-gNB may also occur when a gNB in one cell transmits while the gNB in the other cell is receiving.

In some wireless communications standards (e.g., 3GPP R16), a number (e.g., maxReportCLI) of most interfering CLI resources may be reported in either periodic or event triggered report.

Aspects Related to CLI Resource Reporting

As noted above, when network entities cells that serve neighboring UEs schedule uplink and downlink communications (e.g., on the same frequency resources at the same time), and/or neighboring UEs communicate (e.g., on the same frequency resources at the same time), CLI may occur. To manage CLI, some systems configure CLI resources for an aggressor UE to transmit RS, using different beams, while a victim UE measures RS.

Aspects of the present disclosure provide flexibility in CLI measurement and reporting. According to certain aspects, a UE may report preferred and/or non-preferred CLI resources (e.g., corresponding to transmission beams associated with neighboring UE(s)). For example, a UE may report the top X least interfering CLI resources (e.g., preferred CLI resources or beams) and/or the top X most interfering CLI resources (e.g., non-preferred CLI resources or beams).

Based on the reporting, network entities (e.g., a single cell in an intra-cell scenario or multiple cells in an inter-cell scenario that serve the neighboring UEs) may perform one or more actions in order to mitigate CLI between the neighboring UEs. For example, based on the reporting, a gNB scheduling an aggressor UE may attempt to uses preferred transmit beams and/or avoid non-preferred transmit beams.

Figure 13:
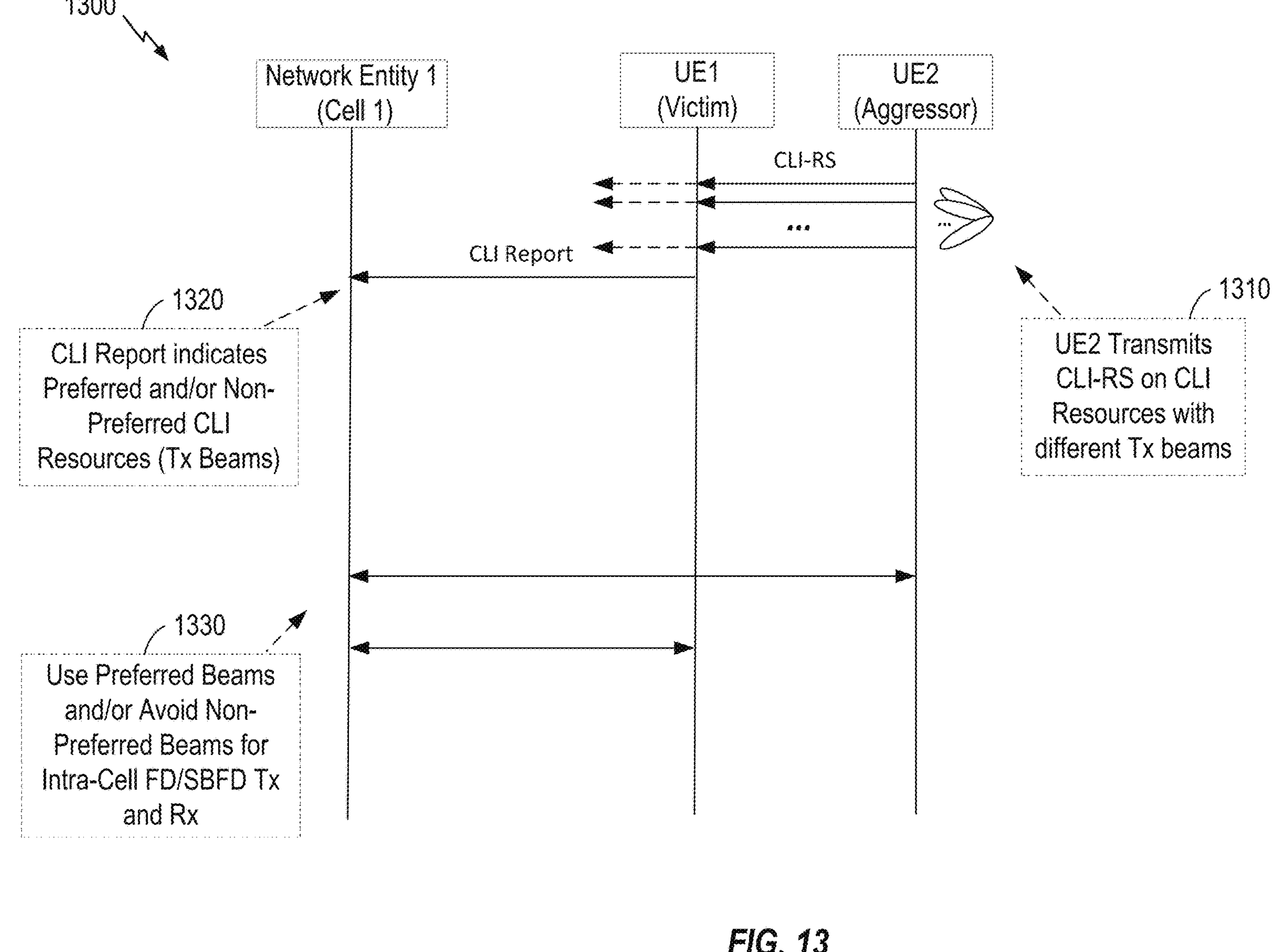
FIG. 13 depicts a call flow diagram illustrating an intra-cell scenario, in accordance with certain aspects of the present disclosure.

The techniques proposed herein may be understood with reference to the call flow diagram 1300 of FIG. 13. In some aspects, the UEs shown in FIG. 13 and/or FIG. 15 may be examples of the UE 104 depicted and described with respect to FIGS. 1 and 3. Similarly, the network entities shown in FIG. 13 and/or FIG. 15 may be example of the BS 102 (e.g., a gNB) depicted and described with respect to FIGS. 1 and 3 or a disaggregated base station depicted and described with respect to FIG. 2.

The example assumes an aggressor UE, UE2, has been configured to transmit CLI-RS (e.g., SRS) on CLI resources. Similarly, the example assumes a victim UE, UE1, has been configured to measure the CLI-RS and report CLI measurement results.

As illustrated at 1310, UE2 may transmit CLI-RSs on CLI resources with different transmit beams. UE1 may measure the CLI-RS, and may transmit a CLI report to a first network entity Network Entity 1 (e.g., a gNB associated with Cell 1).

As illustrated at 1320, the CLI report may indicate preferred and/or non-preferred CLI resources (e.g., transmit beams), based on the measurement/detection of the CLI-RS. The CLI report may be conveyed via at least one of: physical (PHY) layer signaling, medium access control (MAC) layer signaling, or radio resource control (RRC) signaling. In some cases, measurements taken at one layer (e.g., PHY/L1 reference signal received power RSRP) may be filtered to help remove the impact of noise and to improve measurement accuracy.

Network Entity 1 may perform certain actions in an effort to mitigate CLI for UE1, caused by UE2 transmissions. For example, as illustrated at 1330, Network Entity 1 may communicate with UE2, configuring UE2 to use certain preferred transmit beams and/or to avoid using non-preferred transmit beams for intra-cell FD/SBFD transmission and reception.

Network Entity 1 may then communicate with UE1, potentially with reduced CLI, by taking the reported information into account.

In some aspects, a UE may be configured to report the top X preferred and/or non-preferred CLI resources in a UE CLI report. As noted above, each CLI resource may be associated with a Tx beam of the aggressor UE. Preferred CLI resources may refer to CLI resources that had lower levels of interference relative to non-preferred CLI resources.

Based on the information, for an inter-UE intra-cell CLI FD/SBFD network entity (e.g., gNB) scenario, a gNB may decide to use preferred Tx beams of an aggressor UE or avoid using non-preferred Tx beams of aggressor UE. For example, the gNB may use the preferred Tx beams (associated with less interference) or avoid using the non-preferred Tx beams (associated with more interference) for FD/SBFD Tx and Rx within a cell when the gNB pairs/communicates with the victim UE that reported the preferred/non-preferred resources. Such techniques may be applicable to L3/L2/L1 UE CLI measurement and reporting.

Figure 14:
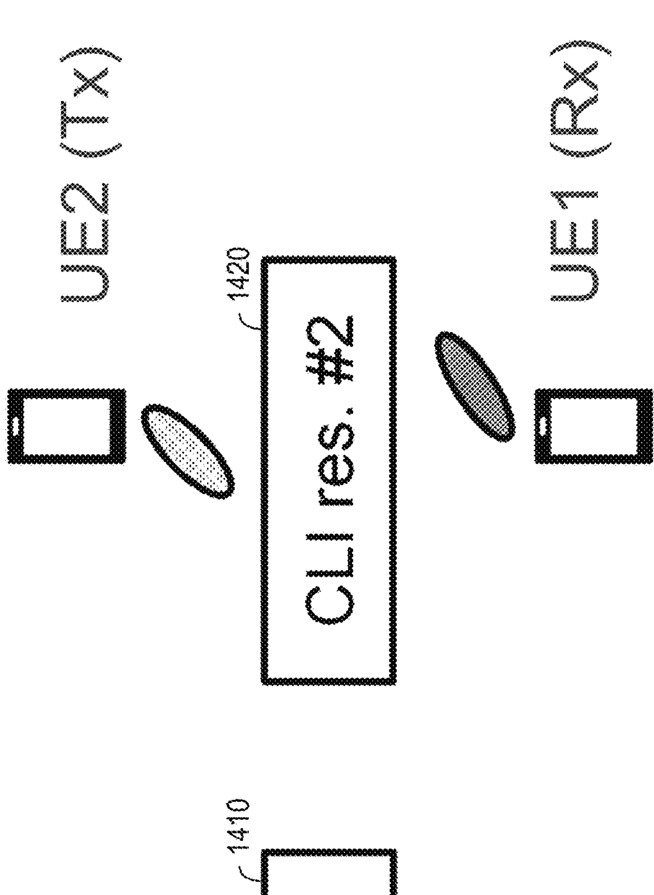
FIG. 14 depicts example CLI resources and corresponding beams, in accordance with certain aspects of the present disclosure.
Figure 14:

FIG. 14 depicts example CLI resources 1400, in accordance with certain aspects of the present disclosure.

As illustrated, UE1 and UE2 may communicate using various CLI resources, CLI resource #1 1410 and CLI resource #2 1420, associated with different transmit beams which may cause varying CLI. For example, as illustrated, transmission on CLI resource #1 using a beam with a direction pointing directly toward UE1 may cause a greater amount of CLI compared to a transmission on CLI resource #2 using a beam direction.

Thus, based on certain aspects of the present disclosure, a UE (e.g., UE1) may report CLI resource #1 as a non-preferred CLI resource and/or may report CLI resource #2 as a preferred CLI resource, based on the amount of interference that they each result in when communicating. Such reporting may be based, for example, on measurement of RS (CLI-RS, such as SRS) transmitted using each of the CLI resources.

Figure 15:
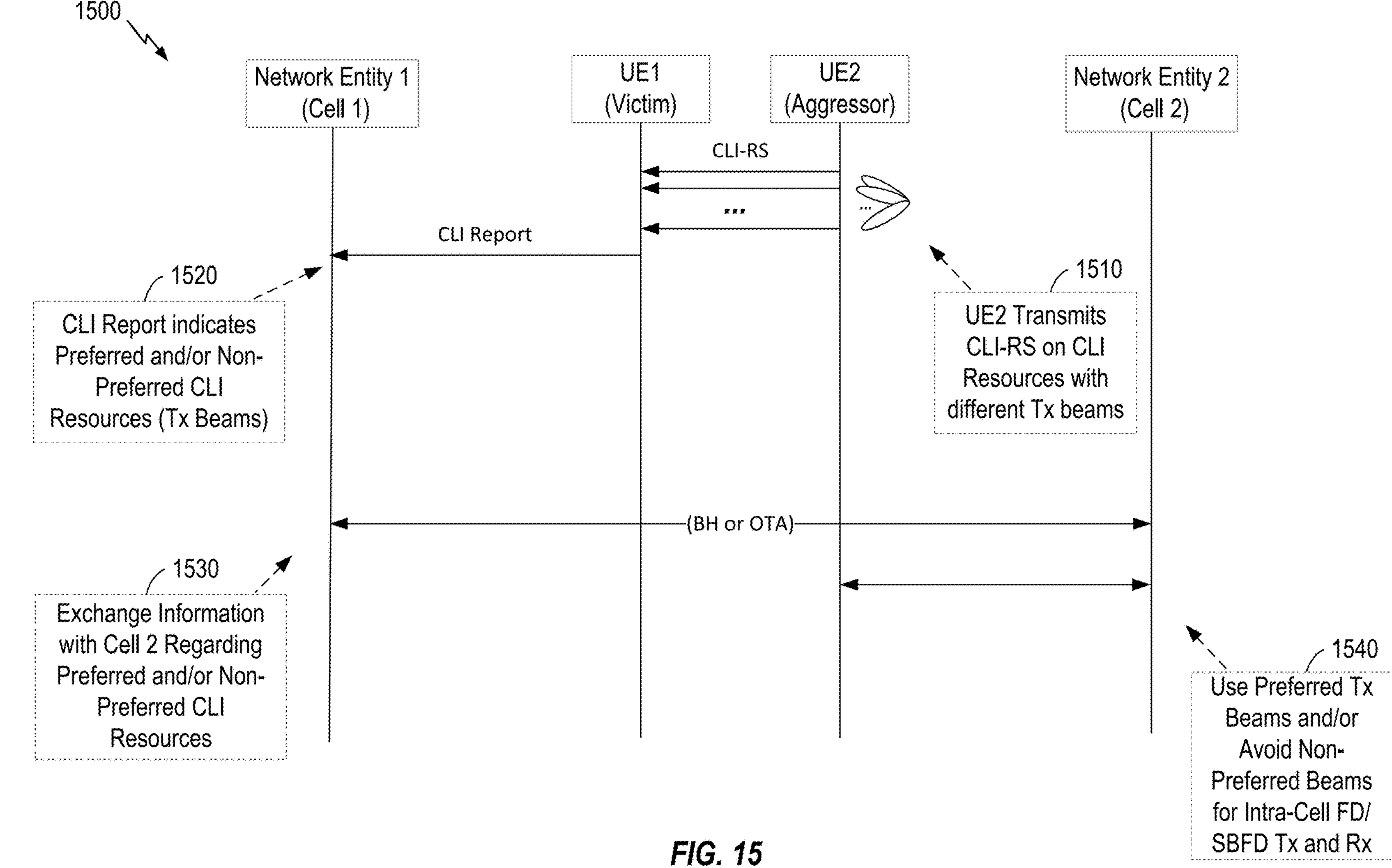
FIG. 15 depicts a call flow diagram illustrating an inter-cell scenario, in accordance with certain aspects of the present disclosure.

FIG. 15 depicts a call flow diagram 1500 illustrating an inter-cell scenario, in accordance with certain aspects of the present disclosure. This example assumes that aggressor UE2 is in a separate cell (Cell 2) than victim UE1. The example again assumes, however, that aggressor UE2 has been configured to transmit CLI-RS on CLI resources (using different Tx beams) and that victim UE1 has been configured to measure the CLI-RS and report CLI measurement results.

As illustrated at 1510, UE2 may transmit CLI-RSs on CLI resources with different transmit beams. UE1 may detect and/or measure the CLI-RS, and may transmit a CLI report to Network Entity 1. As illustrated at 1520, the CLI report may indicate preferred and/or non-preferred CLI resources (e.g., transmit beams), based on the measurement/detection of the CLI-RS.

As illustrated at 1530, Network Entity 1 may communicate with Network Entity 2 (e.g., associated with Cell 2), via backhaul (BH) or over the air (OTA) signaling, in order to exchange information regarding preferred and/or non-preferred CLI resource.

As illustrated at 1540, Network Entity 2 may configure UE2 to use certain preferred transmit beams and/or to avoid using non-preferred transmit beams for intra-cell FD/SBFD transmission and reception.

In some aspects, for inter-UE inter-cell CLI scenario (e.g., two cells for a dynamic TDD scenario or a FD/SBFD gNB scenario), gNBs may exchange information regarding most/least interfering CLI resources corresponding to Tx beam(s) of an aggressor UE or multiple aggressor UEs or preferred and/or non-preferred CLI resources of an aggressor UE of neighbour cell. The Tx beams may be identified based on, for example, identification of CLI resources of multiple aggressor UEs.

In some aspects, a neighbour gNB can use the exchanged information to determine to use preferred Tx beam(s) of an aggressor UE (e.g., of a neighbor cell) or to avoid using non-preferred Tx beam(s) of an aggressor UE during simultaneous Tx/Rx with the victim cell's victim UE. The exchange of information may be via backhaul (BH) signaling (e.g., F1 Application Protocol (F1AP) signaling or Xn signaling) or over the air (OTA) signaling.

In some aspects, a victim UE's serving cell can exchange information with an aggressor UE's serving cell regarding, for example, periodic high priority DL signaling (e.g., and associated quality of service (QoS) class or priority level if any). For example, the victim UE's serving cell may indicate periodic semi-persistently scheduled (SPS) PDSCH, beam failure recovery (BFR)/radio link monitoring (RLM) RS, CORESET, CSI-RS for protection (e.g., from CLI). The neighbor gNB may use the exchanged information for future scheduling, in order to avoid the most interfering CLI/non-preferred Tx beam(s) and/or to the use least interfering/preferred Tx beam(s) of aggressor UE to protect victim cell's high priority DL traffic.

In some aspects, an aggressor UE's serving cell can exchange information with (e.g., transmit to) a victim UE's serving cell regarding, for example, periodic high priority UL signaling, such as configured grant (CG) PUSCH, periodic PUCCH, SRS, and/or PRACH, and associated QoS class or priority level if applicable.

Based on the exchanged information, the victim cell may become aware of the periodic UL resource locations (e.g., where strong CLI may occur), and the victim cell may prepare solutions for CLI reduction. For example, in some aspects, the victim cell may switch beams of the victim UE, or may switch to a different pairing UE based on the exchange information. In other words, the victim gNB's future scheduling may be based on the exchanged information For example, the victim gNB may switch a victim UE's beam, change to a different victim UE on the most interfering CLI/non-preferred beam, and/or may use the least interfering CLI/preferred beam on the interfering UL resources.

Example Operations

Figure 16:
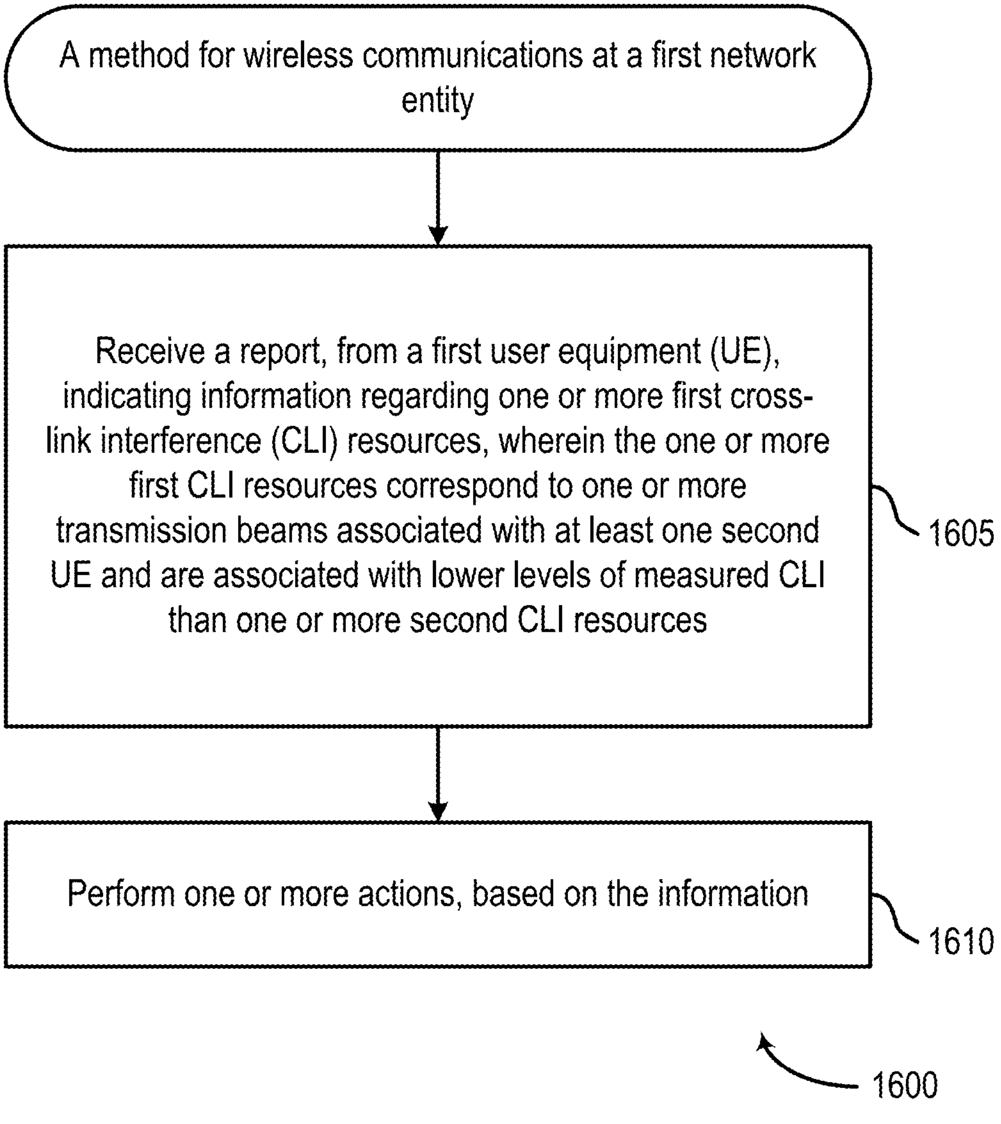
FIG. 16 depicts a method for wireless communications.

FIG. 16 shows an example of a method 1600 of wireless communications at a first network entity, such as a BS 102 of FIGS. 1 and 3, or a disaggregated base station as discussed with respect to FIG. 2.

Method 1600 begins at step 1605 with receiving a report, from a first user equipment (UE), indicating information regarding one or more first cross-link interference (CLI) resources, wherein the one or more first CLI resources correspond to one or more transmission beams associated with at least one second UE and are associated with lower levels of measured CLI than one or more second CLI resources. In some cases, the operations of this step refer to, or may be performed by, circuitry for receiving and/or code for receiving as described with reference to FIG. 20.

Method 1600 then proceeds to step 1610 with performing one or more actions, based on the information. In some cases, the operations of this step refer to, or may be performed by, circuitry for performing and/or code for performing as described with reference to FIG. 20.

In some aspects, the information comprises identification (ID) of the first CLI resources, each corresponding to a different transmission beam used by the at least one second UE for CLI reference signal (RS) transmission.

In some aspects, the one or more actions are designed to reduce cross-link interference (CLI) between the first UE and the second UE.

In some aspects, performing the one or more actions comprises transmitting signaling configuring the at least one second UE to use the first CLI resources.

In some aspects, the report further indicates information regarding the second CLI resources.

In some aspects, performing the one or more actions comprises transmitting signaling configuring the at least one second UE to avoid using the second CLI resources.

In some aspects, the one or more actions comprise signaling, to a second network entity serving at least the second UE, information regarding the first CLI resources.

In some aspects, the report further indicates information regarding the second CLI resources.

In some aspects, the one or more actions comprise signaling, to the second network entity, information regarding the second CLI resources.

In some aspects, the signaling is performed via at least one of: backhaul (BH) signaling or over the air (OTA) signaling.

In some aspects, the one or more actions further comprise signaling, to the second network entity, information regarding characteristics of downlink traffic to the first UE to be protected from CLI.

In some aspects, the characteristics relate to at least one of: whether the traffic is periodically configured, quality of service (QoS) class, or priority level.

In some aspects, the one or more actions further comprise receiving signaling, from the second network entity, information regarding characteristics of uplink traffic from the second UE to be protected from CLI.

In some aspects, the characteristics relate to at least one of: whether the traffic is periodically configured, quality of service (QoS) class, or priority level.

In some aspects, the one or more actions further comprise at least one of switching a beam of the first UE or scheduling downlink transmission to at least a third UE, based on the information regarding characteristics of uplink traffic from the second UE to be protected from CLI.

In some aspects, the report is received via at least one of: physical layer signaling, medium access control (MAC) layer signaling, or radio resource control (RRC) signaling.

Figure 20:
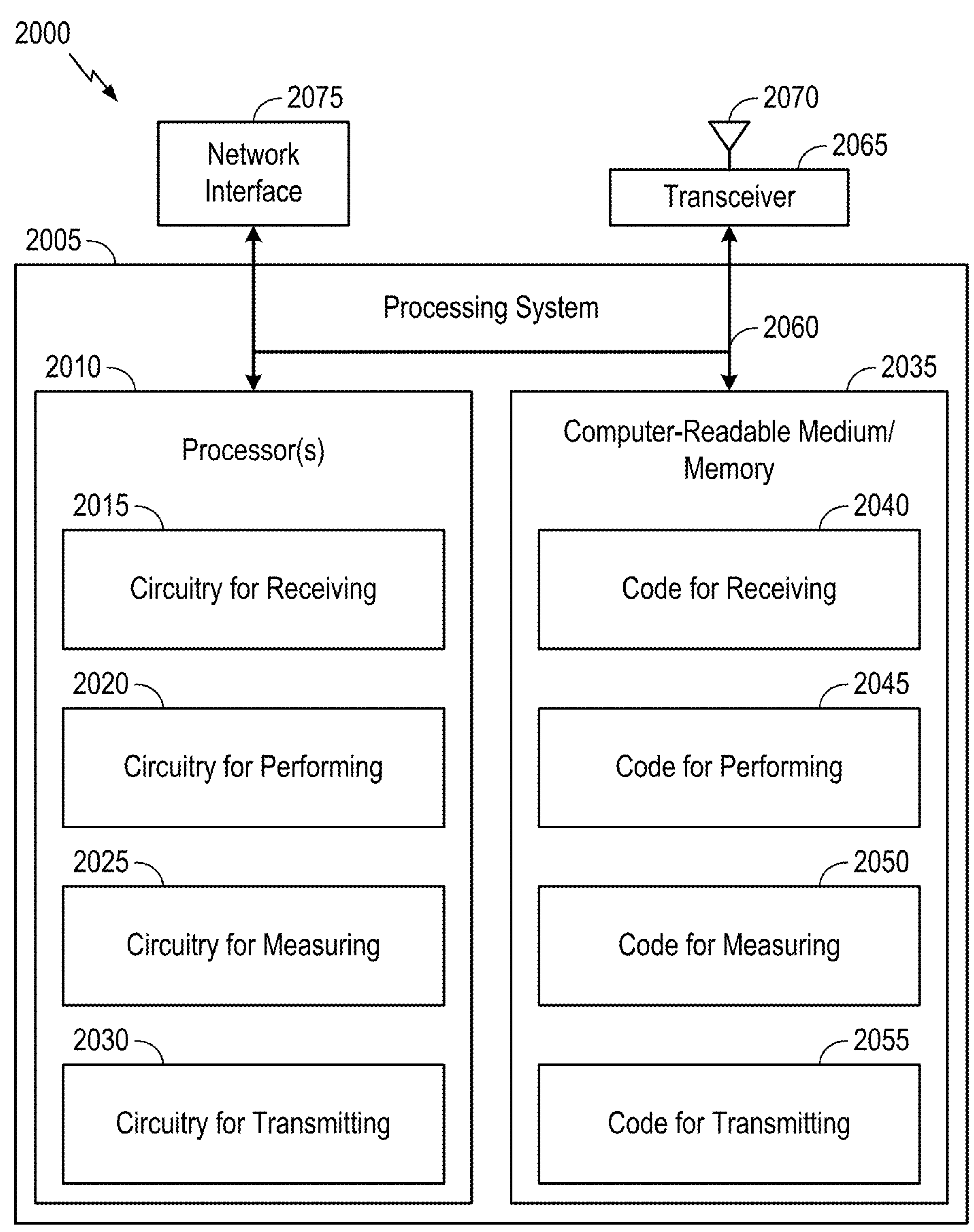
FIG. 20 depicts aspects of an example communications device.

In one aspect, method 1600, or any aspect related to it, may be performed by an apparatus, such as communications device 2000 of FIG. 20, which includes various components operable, configured, or adapted to perform the method 1600. Communications device 2000 is described below in further detail.

Note that FIG. 16 is just one example of a method, and other methods including fewer, additional, or alternative steps are possible consistent with this disclosure.

Figure 17:
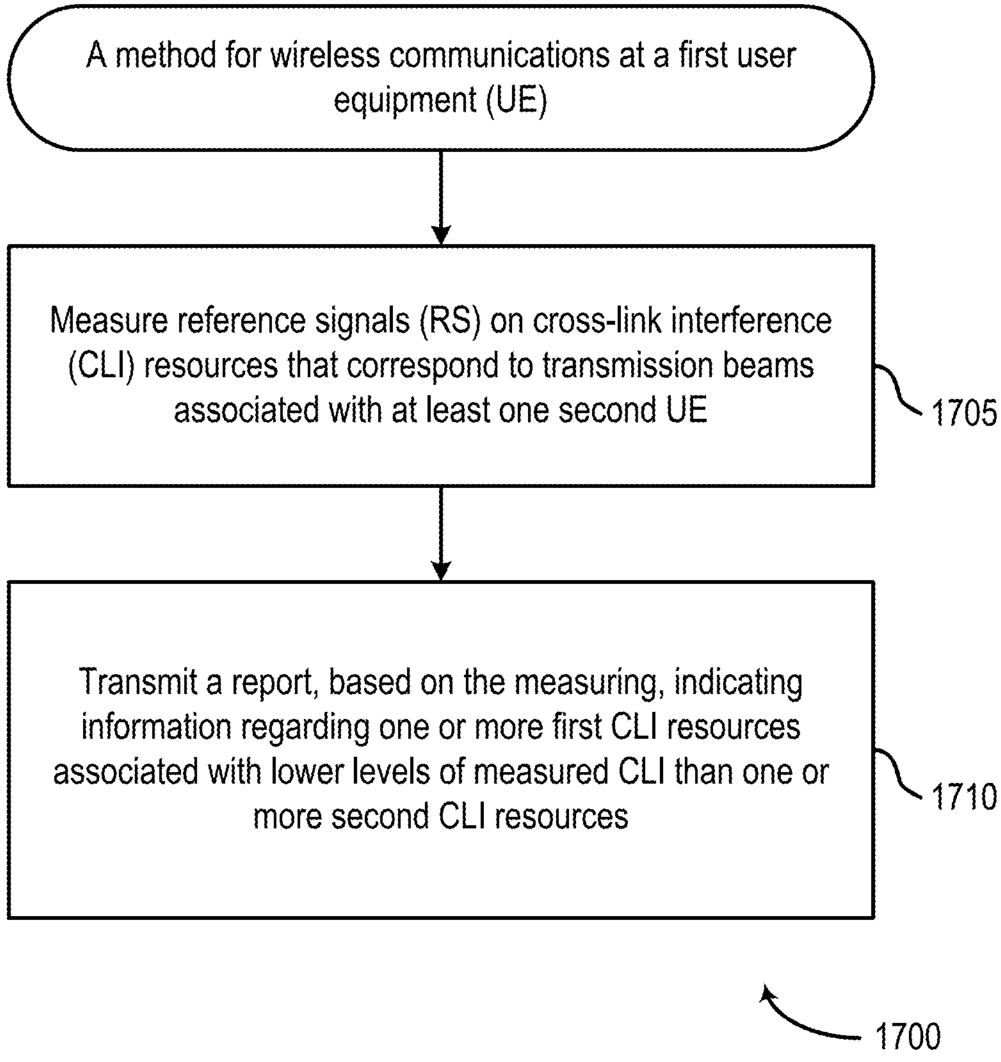
FIG. 17 depicts a method for wireless communications.

FIG. 17 shows an example of a method 1700 of wireless communications at a first user equipment (UE), such as a UE 104 of FIGS. 1 and 3.

Method 1700 begins at step 1705 with measuring reference signals (RS) on cross-link interference (CLI) resources that correspond to transmission beams associated with at least one second UE. In some cases, the operations of this step refer to, or may be performed by, circuitry for measuring and/or code for measuring as described with reference to FIG. 20.

Method 1700 then proceeds to step 1710 with transmitting a report, based on the measuring, indicating information regarding one or more first CLI resources associated with lower levels of measured CLI than one or more second CLI resources. In some cases, the operations of this step refer to, or may be performed by, circuitry for transmitting and/or code for transmitting as described with reference to FIG. 20.

In some aspects, the information comprises identification (ID) of the at least one of the first CLI resources or second CLI resources, each corresponding to a different transmission beam used by the at least one second UE for CLI reference signal (RS) transmission.

In some aspects, the report indicates information regarding both the first CLI resources and the second CLI resources.

In some aspects, the report is transmitted via at least one of: physical layer signaling, medium access control (MAC) layer signaling, or radio resource control (RRC) signaling.

In one aspect, method 1700, or any aspect related to it, may be performed by an apparatus, such as communications device 2000 of FIG. 20, which includes various components operable, configured, or adapted to perform the method 1700. Communications device 2000 is described below in further detail.

Note that FIG. 17 is just one example of a method, and other methods including fewer, additional, or alternative steps are possible consistent with this disclosure.

Figure 18:
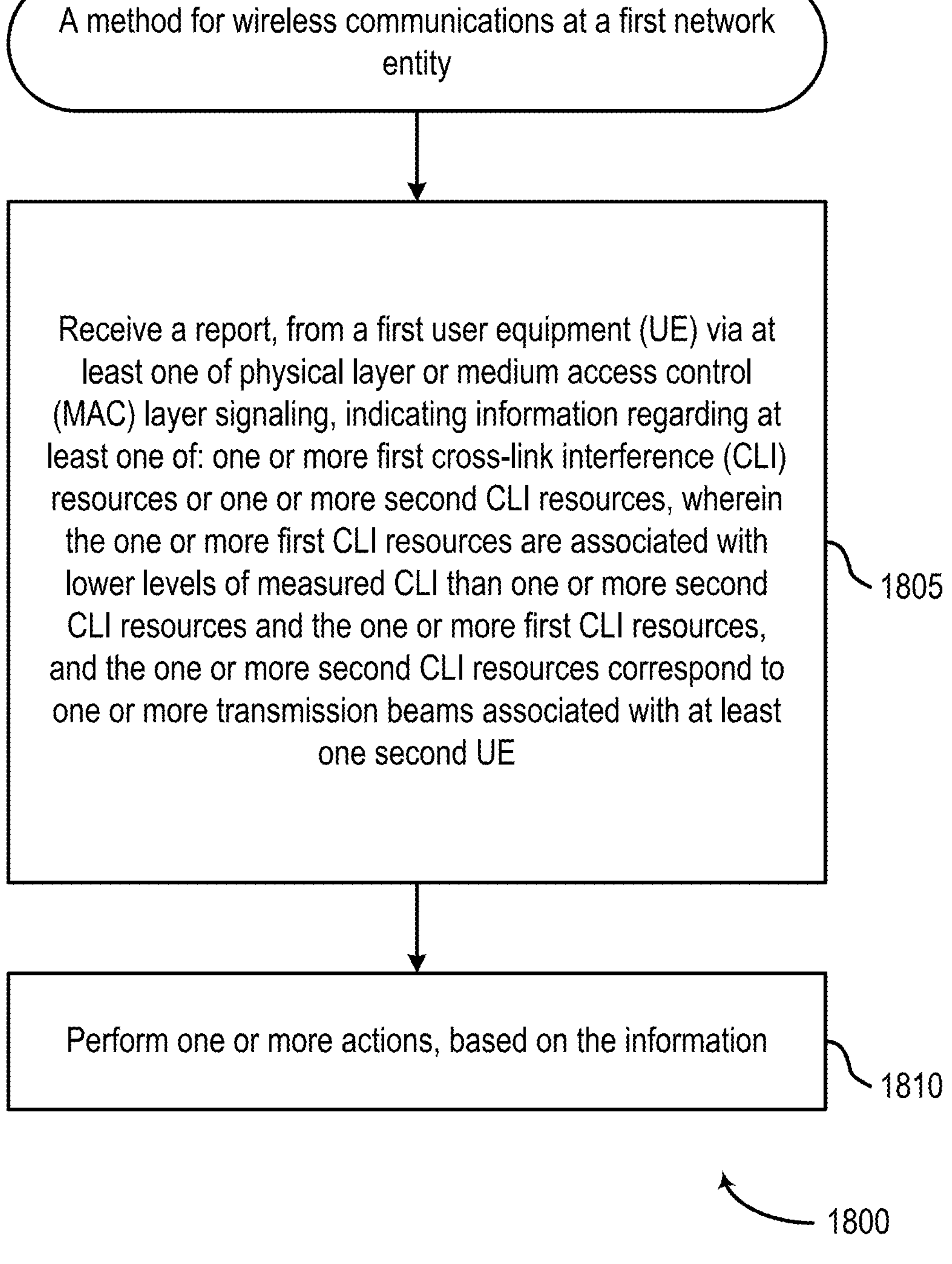
FIG. 18 depicts a method for wireless communications.

FIG. 18 shows an example of a method 1800 of wireless communications at a first network entity, such as a BS 102 of FIGS. 1 and 3, or a disaggregated base station as discussed with respect to FIG. 2.

Method 1800 begins at step 1805 with receiving a report, from a first user equipment (UE) via at least one of physical layer or medium access control (MAC) layer signaling, indicating information regarding at least one of: one or more first cross-link interference (CLI) resources or one or more second CLI resources, wherein the one or more first CLI resources are associated with lower levels of measured CLI than one or more second CLI resources and the one or more first CLI resources, and the one or more second CLI resources correspond to one or more transmission beams associated with at least one second UE. In some cases, the operations of this step refer to, or may be performed by, circuitry for receiving and/or code for receiving as described with reference to FIG. 20.

Method 1800 then proceeds to step 1810 with performing one or more actions, based on the information. In some cases, the operations of this step refer to, or may be performed by, circuitry for performing and/or code for performing as described with reference to FIG. 20.

In some aspects, the information comprises identification (ID) of at least one of the first CLI resources or second CLI resources, each corresponding to a different transmission beam used by the at least one second UE for CLI reference signal (RS) transmission.

In some aspects, the one or more actions are designed to reduce cross-link interference (CLI) between the first UE and the second UE.

In some aspects, performing the one or more actions comprises transmitting signaling configuring the at least one second UE to use the one or more first CLI resources.

In some aspects, the report indicates information regarding the second CLI resources; and performing the one or more actions comprises transmitting signaling configuring the at least one second UE to avoid using the one or more second CLI resources.

In some aspects, the one or more actions comprise signaling, to a second network entity serving at least the second UE, information regarding the one or more first CLI resources.

In some aspects, the report indicates information regarding the one or more second CLI resources; and the one or more actions comprise signaling, to the second network entity, information regarding the one or more second CLI resources.

In some aspects, the signaling is performed via at least one of: backhaul (BH) signaling or over the air (OTA) signaling.

In some aspects, the one or more actions further comprise signaling, to the second network entity, information regarding characteristics of downlink traffic to the first UE to be protected from CLI.

In some aspects, the characteristics relate to at least one of: whether the traffic is periodically configured, quality of service (QoS) class, or priority level.

In some aspects, the one or more actions further comprise receiving signaling, from the second network entity, information regarding characteristics of uplink traffic from the second UE to be protected from CLI.

In some aspects, the characteristics relate to at least one of: whether the traffic is periodically configured, quality of service (QoS) class, or priority level.

In some aspects, the one or more actions further comprise at least one of switching a beam of the first UE or scheduling downlink transmission to at least a third UE, based on the information regarding characteristics of uplink traffic from the second UE to be protected from CLI.

In one aspect, method 1800, or any aspect related to it, may be performed by an apparatus, such as communications device 2000 of FIG. 20, which includes various components operable, configured, or adapted to perform the method 1800. Communications device 2000 is described below in further detail.

Note that FIG. 18 is just one example of a method, and other methods including fewer, additional, or alternative steps are possible consistent with this disclosure.

Figure 19:
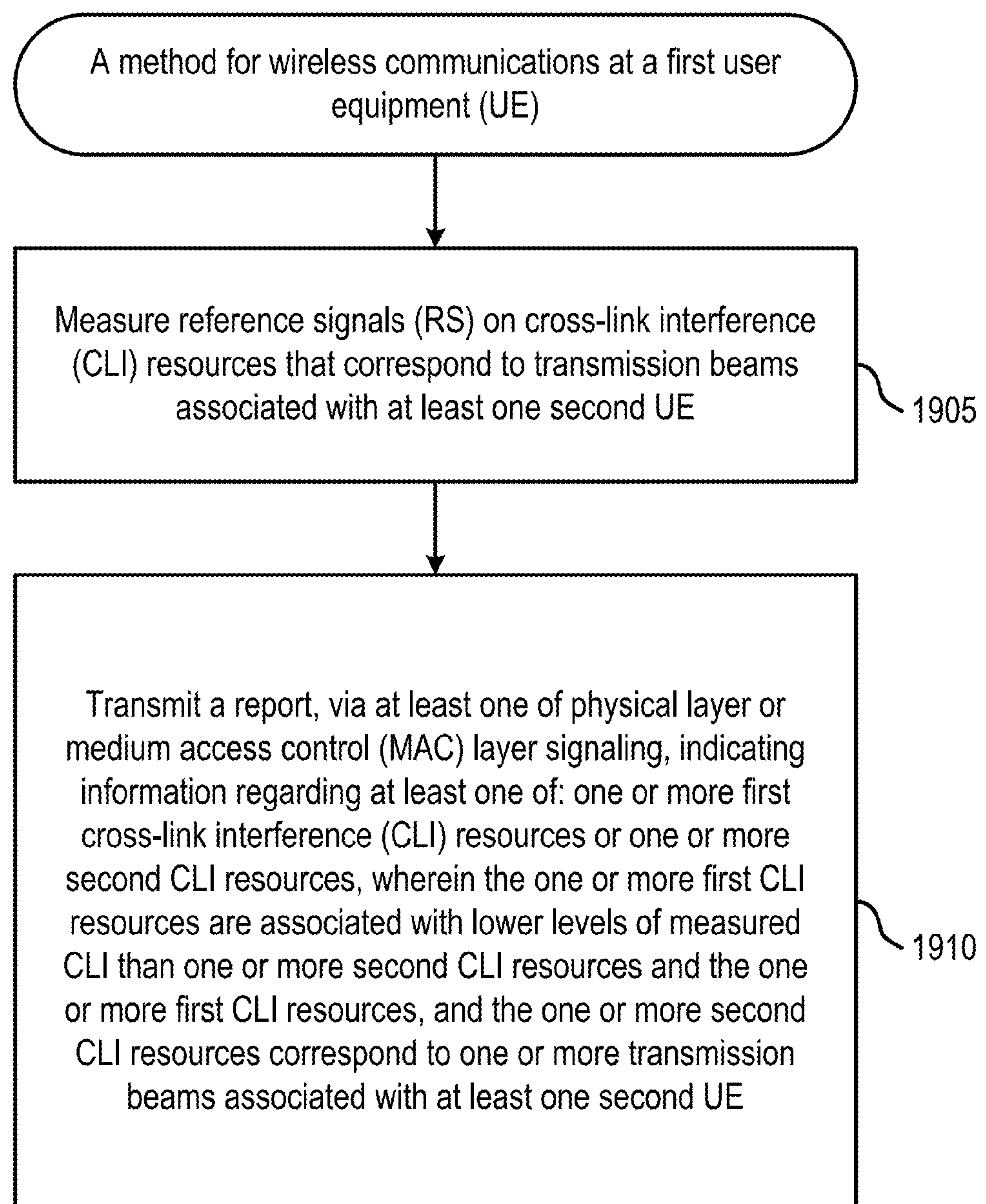
FIG. 19 depicts a method for wireless communications.

FIG. 19 shows an example of a method 1900 of wireless communications at a first user equipment (UE), such as a UE 104 of FIGS. 1 and 3.

Method 1900 begins at step 1905 with measuring reference signals (RS) on cross-link interference (CLI) resources that correspond to transmission beams associated with at least one second UE. In some cases, the operations of this step refer to, or may be performed by, circuitry for measuring and/or code for measuring as described with reference to FIG. 20.

Method 1900 then proceeds to step 1910 with transmitting a report, via at least one of physical layer or medium access control (MAC) layer signaling, indicating information regarding at least one of: one or more first cross-link interference (CLI) resources or one or more second CLI resources, wherein the one or more first CLI resources are associated with lower levels of measured CLI than one or more second CLI resources and the one or more first CLI resources, and the one or more second CLI resources correspond to one or more transmission beams associated with at least one second UE. In some cases, the operations of this step refer to, or may be performed by, circuitry for transmitting and/or code for transmitting as described with reference to FIG. 20.

In some aspects, the information comprises identification (ID) of at least one of the first CLI resources or second CLI resources, each corresponding to a different transmission beam used by the at least one second UE for CLI reference signal (RS) transmission.

In some aspects, the report indicates information regarding both the first CLI resources and the second CLI resources.

In some aspects, the report is transmitted via at least one of: physical layer signaling, medium access control (MAC) layer signaling, or radio resource control (RRC) signaling.

In one aspect, method 1900, or any aspect related to it, may be performed by an apparatus, such as communications device 2000 of FIG. 20, which includes various components operable, configured, or adapted to perform the method 1900. Communications device 2000 is described below in further detail.

Note that FIG. 19 is just one example of a method, and other methods including fewer, additional, or alternative steps are possible consistent with this disclosure.

Example Communications Device(s)

FIG. 20 depicts aspects of an example communications device 2000. In some aspects, communications device 2000 is a user equipment, such as UE 104 described above with respect to FIGS. 1 and 3. In some aspects, communications device 2000 is a network entity, such as BS 102 of FIGS. 1 and 3, or a disaggregated base station as discussed with respect to FIG. 2.

The communications device 2000 includes a processing system 2005 coupled to the transceiver 2065 (e.g., a transmitter and/or a receiver). In some aspects (e.g., when communications device 2000 is a network entity), processing system 2005 may be coupled to a network interface 2075 that is configured to obtain and send signals for the communications device 2000 via communication link(s), such as a backhaul link, midhaul link, and/or fronthaul link as described herein, such as with respect to FIG. 2. The transceiver 2065 is configured to transmit and receive signals for the communications device 2000 via the antenna 2070, such as the various signals as described herein. The processing system 2005 may be configured to perform processing functions for the communications device 2000, including processing signals received and/or to be transmitted by the communications device 2000.

The processing system 2005 includes one or more processors 2010. In various aspects, the one or more processors 2010 may be representative of one or more of receive processor 358, transmit processor 364, TX MIMO processor 366, and/or controller/processor 380, as described with respect to FIG. 3. In various aspects, one or more processors 2010 may be representative of one or more of receive processor 338, transmit processor 320, TX MIMO processor 330, and/or controller/processor 340, as described with respect to FIG. 3. The one or more processors 2010 are coupled to a computer-readable medium/memory 2035 via a bus 2060. In certain aspects, the computer-readable medium/ memory 2035 is configured to store instructions (e.g., computer-executable code) that when executed by the one or more processors 2010, cause the one or more processors 2010 to perform the method 1600 described with respect to FIG. 16, or any aspect related to it; the method 1700 described with respect to FIG. 17, or any aspect related to it; the method 1800 described with respect to FIG. 18, or any aspect related to it; and the method 1900 described with respect to FIG. 19, or any aspect related to it. Note that reference to a processor performing a function of communications device 2000 may include one or more processors 2010 performing that function of communications device 2000.

In the depicted example, computer-readable medium/memory 2035 stores code (e.g., executable instructions), such as code for receiving 2040, code for performing 2045, code for measuring 2050, and code for transmitting 2055. Processing of the code for receiving 2040, code for performing 2045, code for measuring 2050, and code for transmitting 2055 may cause the communications device 2000 to perform the method 1600 described with respect to FIG. 16, or any aspect related to it; the method 1700 described with respect to FIG. 17, or any aspect related to it; the method 1800 described with respect to FIG. 18, or any aspect related to it; and the method 1900 described with respect to FIG. 19, or any aspect related to it.

The one or more processors 2010 include circuitry configured to implement (e.g., execute) the code stored in the computer-readable medium/memory 2035, including circuitry for receiving 2015, circuitry for performing 2020, circuitry for measuring 2025, and circuitry for transmitting 2030. Processing with circuitry for receiving 2015, circuitry for performing 2020, circuitry for measuring 2025, and circuitry for transmitting 2030 may cause the communications device 2000 to perform the method 1600 described with respect to FIG. 16, or any aspect related to it; the method 1700 described with respect to FIG. 17, or any aspect related to it; the method 1800 described with respect to FIG. 18, or any aspect related to it; and the method 1900 described with respect to FIG. 19, or any aspect related to it.

Various components of the communications device 2000 may provide means for performing the method 1600 described with respect to FIG. 16, or any aspect related to it; the method 1700 described with respect to FIG. 17, or any aspect related to it; the method 1800 described with respect to FIG. 18, or any aspect related to it; and the method 1900 described with respect to FIG. 19, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 2065 and the antenna 2070 of the communications device 2000 in FIG. 20. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 2065 and the antenna 2070 of the communications device 2000 in FIG. 20.

EXAMPLE CLAUSES

Implementation examples are described in the following numbered clauses:

Clause 1: A method for wireless communications at a first network entity, comprising: receiving a report, from a first user equipment (UE), indicating information regarding one or more first cross-link interference (CLI) resources, wherein the one or more first CLI resources correspond to one or more transmission beams associated with at least one second UE and are associated with lower levels of measured CLI than one or more second CLI resources; and performing one or more actions, based on the information.

Clause 2: The method of Clause 1, wherein the information comprises identification (ID) of the first CLI resources, each corresponding to a different transmission beam used by the at least one second UE for CLI reference signal (RS) transmission.

Clause 3: The method of any one of Clauses 1-2, wherein the one or more actions are designed to reduce cross-link interference (CLI) between the first UE and the second UE.

Clause 4: The method of any one of Clauses 1-3, wherein performing the one or more actions comprises transmitting signaling configuring the at least one second UE to use the first CLI resources.

Clause 5: The method of any one of Clauses 1-4, wherein the report further indicates information regarding the second CLI resources.

Clause 6: The method of Clause 5, wherein performing the one or more actions comprises transmitting signaling configuring the at least one second UE to avoid using the second CLI resources.

Clause 7: The method of any one of Clauses 1-6, wherein the one or more actions comprise signaling, to a second network entity serving at least the second UE, information regarding the first CLI resources.

Clause 8: The method of Clause 7, wherein: the report further indicates information regarding the second CLI resources.

Clause 9: The method of Clause 8, wherein the one or more actions comprise signaling, to the second network entity, information regarding the second CLI resources.

Clause 10: The method of Clause 7, wherein the signaling is performed via at least one of: backhaul (BH) signaling or over the air (OTA) signaling.

Clause 11: The method of Clause 7, wherein the one or more actions further comprise signaling, to the second network entity, information regarding characteristics of downlink traffic to the first UE to be protected from CLI.

Clause 12: The method of Clause 11, wherein the characteristics relate to at least one of: whether the traffic is periodically configured, quality of service (QoS) class, or priority level.

Clause 13: The method of Clause 7, wherein the one or more actions further comprise receiving signaling, from the second network entity, information regarding characteristics of uplink traffic from the second UE to be protected from CLI.

Clause 14: The method of Clause 13, wherein the characteristics relate to at least one of: whether the traffic is periodically configured, quality of service (QoS) class, or priority level.

Clause 15: The method of Clause 13, wherein the one or more actions further comprise at least one of switching a beam of the first UE or scheduling downlink transmission to at least a third UE, based on the information regarding characteristics of uplink traffic from the second UE to be protected from CLI.

Clause 16: The method of any one of Clauses 1-15, wherein the report is received via at least one of: physical layer signaling, medium access control (MAC) layer signaling, or radio resource control (RRC) signaling.

Clause 17: A method for wireless communications at a first user equipment (UE), comprising: measuring reference signals (RS) on cross-link interference (CLI) resources that correspond to transmission beams associated with at least one second UE; and transmitting a report, based on the measuring, indicating information regarding one or more first CLI resources associated with lower levels of measured CLI than one or more second CLI resources.

Clause 18: The method of Clause 17, wherein the information comprises identification (ID) of the at least one of the first CLI resources or second CLI resources, each corresponding to a different transmission beam used by the at least one second UE for CLI reference signal (RS) transmission.

Clause 19: The method of any one of Clauses 17-18, wherein the report indicates information regarding both the first CLI resources and the second CLI resources.

Clause 20: The method of any one of Clauses 17-19, wherein the report is transmitted via at least one of: physical layer signaling, medium access control (MAC) layer signaling, or radio resource control (RRC) signaling.

Clause 21: A method for wireless communications at a first network entity, comprising: receiving a report, from a first user equipment (UE) via at least one of physical layer or medium access control (MAC) layer signaling, indicating information regarding at least one of: one or more first cross-link interference (CLI) resources or one or more second CLI resources, wherein the one or more first CLI resources are associated with lower levels of measured CLI than one or more second CLI resources and the one or more first CLI resources, and the one or more second CLI resources correspond to one or more transmission beams associated with at least one second UE; and performing one or more actions, based on the information.

Clause 22: The method of Clause 21, wherein the information comprises identification (ID) of at least one of the first CLI resources or second CLI resources, each corresponding to a different transmission beam used by the at least one second UE for CLI reference signal (RS) transmission.

Clause 23: The method of any one of Clauses 21-22, wherein the one or more actions are designed to reduce cross-link interference (CLI) between the first UE and the second UE.

Clause 24: The method of any one of Clauses 21-23, wherein performing the one or more actions comprises transmitting signaling configuring the at least one second UE to use the one or more first CLI resources.

Clause 25: The method of any one of Clauses 21-24, wherein: the report indicates information regarding the second CLI resources; and performing the one or more actions comprises transmitting signaling configuring the at least one second UE to avoid using the one or more second CLI resources.

Clause 26: The method of any one of Clauses 21-25, wherein the one or more actions comprise signaling, to a second network entity serving at least the second UE, information regarding the one or more first CLI resources.

Clause 27: The method of Clause 26, wherein: the report indicates information regarding the one or more second CLI resources; and the one or more actions comprise signaling, to the second network entity, information regarding the one or more second CLI resources.

Clause 28: The method of Clause 26, wherein the signaling is performed via at least one of: backhaul (BH) signaling or over the air (OTA) signaling.

Clause 29: The method of Clause 26, wherein the one or more actions further comprise signaling, to the second network entity, information regarding characteristics of downlink traffic to the first UE to be protected from CLI.

Clause 30: The method of Clause 29, wherein the characteristics relate to at least one of: whether the traffic is periodically configured, quality of service (QoS) class, or priority level.

Clause 31: The method of Clause 26, wherein the one or more actions further comprise receiving signaling, from the second network entity, information regarding characteristics of uplink traffic from the second UE to be protected from CLI.

Clause 32: The method of Clause 31, wherein the characteristics relate to at least one of: whether the traffic is periodically configured, quality of service (QoS) class, or priority level.

Clause 33: The method of Clause 31, wherein the one or more actions further comprise at least one of switching a beam of the first UE or scheduling downlink transmission to at least a third UE, based on the information regarding characteristics of uplink traffic from the second UE to be protected from CLI.

Clause 34: A method for wireless communications at a first user equipment (UE), comprising: measuring reference signals (RS) on cross-link interference (CLI) resources that correspond to transmission beams associated with at least one second UE; and transmitting a report, via at least one of physical layer or medium access control (MAC) layer signaling, indicating information regarding at least one of: one or more first cross-link interference (CLI) resources or one or more second CLI resources, wherein the one or more first CLI resources are associated with lower levels of measured CLI than one or more second CLI resources and the one or more first CLI resources, and the one or more second CLI resources correspond to one or more transmission beams associated with at least one second UE.

Clause 35: The method of Clause 34, wherein the information comprises identification (ID) of at least one of the first CLI resources or second CLI resources, each corresponding to a different transmission beam used by the at least one second UE for CLI reference signal (RS) transmission.

Clause 36: The method of any one of Clauses 34-35, wherein the report indicates information regarding both the first CLI resources and the second CLI resources.

Clause 37: The method of any one of Clauses 34-36, wherein the report is transmitted via at least one of: physical layer signaling, medium access control (MAC) layer signaling, or radio resource control (RRC) signaling.

Clause 38: An apparatus, comprising: a memory comprising executable instructions; and a processor configured to execute the executable instructions and cause the apparatus to perform a method in accordance with any one of Clauses 1-37.

Clause 39: An apparatus, comprising means for performing a method in accordance with any one of Clauses 1-37.

Clause 40: A non-transitory computer-readable medium comprising executable instructions that, when executed by a processor of an apparatus, cause the apparatus to perform a method in accordance with any one of Clauses 1-37.

Clause 41: A computer program product embodied on a computer-readable storage medium comprising code for performing a method in accordance with any one of Clauses 1-37.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication at a first network entity, the apparatus comprising:

one or more memories comprising computer-executable instructions; and one or more processors configured to, individually or collectively, execute the computer-executable instructions to cause the apparatus to:

receive a report, from a first user equipment (UE), indicating information regarding one or more first cross-link interference (CLI) resources, wherein the one or more first CLI resources correspond to one or more transmission beams associated with at least one second UE and are associated with lower levels of measured CLI than one or more second CLI resources; and perform one or more actions, based on the information, wherein the one or more actions comprise transmitting signaling configuring the at least one second UE to use the one or more first CLI resources.

2. The apparatus of claim 1, wherein the information comprises identification (ID) of the one or more first CLI resources, each corresponding to a different transmission beam used by the at least one second UE for CLI reference signal (RS) transmission.

3. The apparatus of claim 1, wherein the one or more actions are designed to reduce CLI between the first UE and the second UE.

4. The apparatus of claim 1, wherein:

the report further indicates information regarding the one or more second CLI resources; and the one or more actions further comprise transmitting signaling configuring the at least one second UE to avoid using the one or more second CLI resources.

5. The apparatus of claim 1, wherein the one or more actions further comprise signaling, to a second network entity serving at least the second UE, information regarding the one or more first CLI resources.

6. The apparatus of claim 5, wherein:

the report further indicates information regarding the one or more second CLI resources and the one or more actions further comprise signaling, to the second network entity, information regarding the one or more second CLI resources.

7. The apparatus of claim 5, wherein:

the one or more actions further comprise signaling, to the second network entity, information regarding characteristics of downlink traffic to the first UE to be protected from CLI; and the characteristics relate to at least one of: whether the downlink traffic is periodically configured, quality of service (QoS) class, or priority level.

8. The apparatus of claim 5, wherein the one or more actions further comprise receiving signaling, from the second network entity, information regarding characteristics of uplink traffic from the second UE to be protected from CLI.

9. The apparatus of claim 8, wherein the one or more actions further comprise at least one of switching a beam of the first UE or scheduling downlink transmission to at least a third UE, based on the information regarding characteristics of uplink traffic from the second UE to be protected from CLI.

10. An apparatus for wireless communication at a first user equipment (UE), the apparatus comprising:

one or more memories comprising computer-executable instructions; and one or more processors configured to, individually or collectively, execute the computer-executable instructions to cause the apparatus to:

measure inter-cell or intra-cell reference signals (RS) on a plurality of cross-link interference (CLI) subband resources that correspond to transmission beams associated with at least one second UE; and transmit a report, based on the measuring, indicating information regarding (i) a first subset of CLI subband resources associated with lowest levels of measured CLI among the plurality of CLI subband resources and (ii) a second set of CLI subband resources having highest levels of measured CLI among the plurality of subband resources.

11. The apparatus of claim 10, wherein the information comprises an identifier (ID) of the at least one of the first subset of CLI subband resources or the second subset of CLI subband resources, each corresponding to a different transmission beam used by the at least one second UE for the inter-cell or intra-cell RS.

12. An apparatus for wireless communication at a first network entity, the apparatus comprising:

one or more memories comprising computer-executable instructions; and one or more processors configured to, individually or collectively, execute the computer-executable instructions to cause the apparatus to:

receive a report, from a first user equipment (UE) via at least one of physical layer or medium access control (MAC) layer signaling, indicating information regarding at least one of: one or more first cross-link interference (CLI) resources or one or more second CLI resources, wherein the one or more first CLI resources and the one or more second CLI resources correspond to one or more transmission beams associated with at least one second UE; and perform one or more actions, based on the information, wherein the one or more actions comprise transmitting signaling configuring the at least one second UE to use the one or more first CLI resources.

13. The apparatus of claim 12, wherein:

the one or more first CLI resources are associated with lower levels of measured CLI than one or more second CLI resources and the one or more first CLI resources and the one or more second CLI resources correspond to one or more transmission beams associated with at least one second UE.

14. The apparatus of claim 13, wherein at least one of:

the one or more first CLI resources comprise a first quantity of CLI resources associated with lowest levels of measured CLI; or the one or more second CLI resources comprise a second quantity of CLI resources associated with highest levels of measured CLI.

15. The apparatus of claim 13, wherein at least one of:

the one or more first CLI resources comprise a first quantity of preferred CLI resources; or the one or more second CLI resources comprise a second quantity of non-preferred CLI resources.

16. The apparatus of claim 12, wherein the information comprises identification (ID) of at least one of the one or more first CLI resources or the one or more second CLI resources, each corresponding to a different transmission beam used by the at least one second UE for CLI reference signal (RS) transmission.

17. The apparatus of claim 12, wherein:

the report indicates information regarding the one or more second CLI resources; and the one or more actions further comprise transmitting signaling configuring the at least one second UE to avoid using the one or more second CLI resources.

18. The apparatus of claim 12, wherein the one or more actions further comprise signaling, to a second network entity serving at least the second UE, information regarding the one or more first CLI resources.

19. The apparatus of claim 18, wherein:

the one or more actions further comprise signaling, to the second network entity, information regarding characteristics of downlink traffic to the first UE to be protected from CLI, and the characteristics relate to at least one of: whether the downlink traffic is periodically configured, quality of service (QoS) class, or priority level.

20. The apparatus of claim 18, wherein the one or more actions further comprise receiving signaling, from the second network entity, information regarding characteristics of uplink traffic from the second UE to be protected from CLI.

21. The apparatus of claim 20, wherein the one or more actions further comprise at least one of switching a beam of the first UE or scheduling downlink transmission to at least a third UE, based on the information regarding characteristics of uplink traffic from the second UE to be protected from CLI.

22. An apparatus for wireless communication at a first user equipment (UE), the apparatus comprising:

one or more memories comprising computer-executable instructions; and one or more processors configured to, individually or collectively, execute the computer-executable instructions to cause the apparatus to:

measure inter-cell or intra-cell reference signals (RS) on a plurality of cross-link interference (CLI) subband resources that correspond to transmission beams associated with at least one second UE; and transmit a report, via at least one of physical layer or medium access control (MAC) layer signaling, indicating information regarding (i) a first subset of cross-link interference (CLI) subband resources associated with lowest levels of measured CLI among the plurality of CLI subband resources and (ii) a second subset of CLI subband resources having highest levels of measured CLI among the plurality of subband resources.

23. The apparatus of claim 22, wherein the information comprises an identifier (ID) of the at least one of the first subset of CLI subband resources or the second subset of CLI subband resources, each corresponding to a different transmission beam used by the at least one second UE for the inter-cell or intra-cell RS.

* * * * *